(12) United States Patent
Henderson et al.

(10) Patent No.: US 11,517,802 B1
(45) Date of Patent: *Dec. 6, 2022

(54) WIRELESS GAME MANAGEMENT SYSTEM

(71) Applicants: Daniel A. Henderson, El Paso, TX (US); William P. Rutledge, Pacific Palisades, CA (US)

(72) Inventors: Daniel A. Henderson, El Paso, TX (US); William P. Rutledge, Pacific Palisades, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/195,030

(22) Filed: Mar. 8, 2021

Related U.S. Application Data

(63) Continuation-in-part of application No. 16/506,370, filed on Jul. 9, 2019, now Pat. No. 10,940,379.

(60) Provisional application No. 62/696,159, filed on Jul. 10, 2018.

(51) Int. Cl.
| | | |
|---|---|---|
| *A63F 13/00* | (2014.01) | |
| *A63B 67/06* | (2006.01) | |
| *A63B 24/00* | (2006.01) | |
| *A63F 13/90* | (2014.01) | |
| *A63F 13/327* | (2014.01) | |

(52) U.S. Cl.
CPC ........ *A63B 67/068* (2013.01); *A63B 24/0021* (2013.01); *A63F 13/327* (2014.09); *A63F 13/90* (2014.09); *A63B 2024/0028* (2013.01); *A63B 2220/10* (2013.01); *A63B 2243/0062* (2013.01)

(58) Field of Classification Search
CPC ................ A63F 13/812; A63F 3/00643; A63F 2003/00662; A63B 2024/0021; A63B 2024/0024; A63B 2220/10; A63B 2220/12; A63B 2220/13; A63B 2220/833; A63B 2243/0062
See application file for complete search history.

(56) References Cited

U.S. PATENT DOCUMENTS

| | | | | |
|---|---|---|---|---|
| 4,981,300 A | * | 1/1991 | Winkler | A63F 3/00694 273/237 |
| 5,013,047 A | * | 5/1991 | Schwab | G06F 3/033 273/238 |
| 5,125,669 A | | 6/1992 | Kanda | |
| 5,303,915 A | * | 4/1994 | Candy | A63B 71/0605 340/323 R |

(Continued)

OTHER PUBLICATIONS

AirMeasure AR Bocce Ball, retrieved from You Tube at: <https://www.youtube.com/watch?v=D7oKgWCopUw//>, dated Aug. 20, 2018 (1 page).

(Continued)

*Primary Examiner* — Milap Shah
(74) *Attorney, Agent, or Firm* — Nutter McClennen & Fish LLP

(57) ABSTRACT

A wireless game management system includes a plurality of game pieces, each game piece including a wireless module configured to transmit a location signal, and a wireless game management processor configured to determine the absolute or relative positions of at least two game pieces based on the location signals, determine a game status based on the absolute or relative positions of the at least two game pieces, and convey game status information through a user interface associated with the wireless game management processor.

26 Claims, 25 Drawing Sheets

(9 of 25 Drawing Sheet(s) Filed in Color)

(56) References Cited

U.S. PATENT DOCUMENTS

| | | | |
|---|---|---|---|
| 5,328,188 A * | 7/1994 | Brotz | A63B 67/06 |
| | | | 273/129 R |
| 5,853,327 A * | 12/1998 | Gilboa | A63F 13/235 |
| | | | 273/237 |
| 5,910,057 A | 6/1999 | Quimby et al. | |
| 6,124,708 A * | 9/2000 | Dames | G01D 5/2053 |
| | | | 324/207.17 |
| 6,690,156 B1 | 2/2004 | Weiner et al. | |
| 6,859,761 B2 | 2/2005 | Bensky et al. | |
| 6,998,965 B1 | 2/2006 | Luciano, Jr. et al. | |
| 7,474,983 B2 | 1/2009 | Mazalek et al. | |
| 7,868,815 B2 | 1/2011 | Fukagawa et al. | |
| 8,172,722 B2 | 5/2012 | Molyneux et al. | |
| 8,737,515 B2 | 5/2014 | Ruland | |
| 9,646,199 B2 | 5/2017 | Bose et al. | |
| 9,754,373 B2 | 9/2017 | Seita | |
| 10,940,379 B1 * | 3/2021 | Rutledge | A63B 37/0098 |
| 2005/0143199 A1 | 6/2005 | Saroyan | |
| 2006/0175753 A1 * | 8/2006 | MacIver | A63F 3/00643 |
| | | | 463/43 |
| 2006/0267286 A1 | 11/2006 | Hickey | |
| 2007/0262518 A1 | 11/2007 | Lapinski et al. | |
| 2007/0299625 A1 * | 12/2007 | Englert | A63B 63/004 |
| | | | 324/207.11 |
| 2009/0072817 A1 * | 3/2009 | Bucher | A63B 24/00 |
| | | | 324/207.11 |
| 2010/0295248 A1 | 11/2010 | Krause et al. | |
| 2011/0298452 A1 * | 12/2011 | Mao | G06F 3/011 |
| | | | 324/251 |
| 2012/0056717 A1 | 3/2012 | Maharbiz et al. | |
| 2013/0075972 A1 | 3/2013 | Payer | |
| 2014/0213357 A1 | 7/2014 | Claffey | |
| 2015/0088464 A1 | 3/2015 | Yuen et al. | |
| 2015/0146003 A1 | 5/2015 | Seita | |
| 2016/0067608 A1 * | 3/2016 | Yim | G06F 3/038 |
| | | | 463/31 |
| 2020/0222793 A1 * | 7/2020 | Garofalo | A63F 13/214 |
| 2020/0282297 A1 * | 9/2020 | Mehta | A63F 13/34 |

OTHER PUBLICATIONS

Best Bocce ball apps for Android, includes a number of apps for scoring or virtually playing games such as bocce, petanque, bowling, etc., retrieved from the Internet at: <http://bocce-ball.allbestapps.net//>, date unknown, downloaded Jul. 26, 2022 (11 pages).

Bocce Ball Measuring Device, retrieved from the Internet at <//boccestik.com//>, date unknown, downloaded Jul. 26, 2022 (7 pages).

Bocce measure, retrieved from Google Play at: <//play.google.com/store/apps//>, on Mar. 23, 2021 (3 pages).

Booble Premium, retrieved from Google Play at: <//play.google.com/store/apps//, on Mar. 9, 2021 (3 pages).

Bowlometer for iPhone & iPad, retrieved from Apple Apps at: <//apps.apple.com/US/app//>, on Feb. 9, 2019 (first release) (3 pages).

Metre Petanque, retrieved from the Internet at Google Play: <https://play.google.com/store/apps/details?id=com.petanque.metre&hl=en US&gl=US//>, updated Jan. 30, 2022 (4 pages).

Petanque Meter 3.9.3, retrieved from the Internet at: <https://meter-bowls-petanque.soft112.com//>, dated Sep. 29, 2020 (6 pages).

* cited by examiner

Screen #1 - System Check

○ Display Distance

B1 ○ ---------- O P ---------------- B2 ○

Ball Distance

Manual   System
Ball 1  _____  _____
Ball 2  _____  _____

○ Refresh          ○ Next Screen

FIG. 5a

Screen #2 - Game Type

⊖ League
    ○ [Team Name]
    ○ [Team Name]

⊖ Non-League
    ○ [Team/Player Name]
    ○ [Team/Player Name]

○ Previous Screen    ○ Next Screen

FIG. 5b

Screen #3 - Location/Team/Player

Date_____ Time_____ Club/Location_____ Court_____

[Team Name] _____ [Team Name] _____

Captain ○ [Name]          Captain ○ [Name]
　　　　○ Alice Green　　　　　　○ Alan Smith
　　　　○ Bruce Platt　　　　　　○ Bert Catton
　　　　○ Etc.　　　　　　　　　○ Etc.
　　　　○ Etc.　　　　　　　　　○ Etc.
　　　　○ Etc.　　　　　　　　　○ Etc.
　　　　○ Sub　　　　　　　　　○ Sub
　　　　○ Sub　　　　　　　　　○ Sub
○ PREVIOUS SCREEN　　　　　○ NEXT SCREEN

*FIG. 5c*

Screen #4 - Coin Toss

| | |
|---|---|
| Winner | ○ [Team Name] |
| Loser | ○ [Team Name] |
| Winner choice | ○ START |
| | ○ RED　　　○ GREEN |
| Loser choice | ○ START |
| | ○ RED　　　○ GREEN |

○ PREVIOUS SCREEN　　　　　○ NEXT SCREEN

*FIG. 5d*

Screen #5 - Pallino Throw

Green OK - Red DQ

[Starting Team Name]   $1^{st}$ Throw   ○

[Opponent Team Name]   $2^{nd}$ Throw   ○

[Starting Team Name]   $3^{rd}$ Throw   ○

Placement   ○

○ PREVIOUS SCREEN            ○ NEXT SCREEN

*FIG. 5e*

Screen #6 - Whose Throw?

[Team Name] _____   [Team Name] _____

[Ball Color] _____   [Ball Color] _____

Captain ○ [Name]   [Throw #]      Captain ○ [Name]   [Throw #]
　　　　○ Alice Green   ○            　　　　○ Alan Smith    ○
　　　　○ Bruce Platt   ○            　　　　○ Bert Catton   ○
　　　　○ Etc.          ○            　　　　○ Etc.          ○
　　　　○ Etc.          ○            　　　　○ Etc.          ○
　　　　○ Etc.          ○            　　　　○ Etc.          ○
　　　　○ Sub           ○            　　　　○ Sub           ○
　　　　○ Sub           ○            　　　　○ Sub           ○

○ PREVIOUS SCREEN                              ○ NEXT SCREEN

*FIG. 5f*

Screen #7 - Play/Score

Game# [ ]   Balls in Point [num.- color]   Game Score
Frame# [ ]                                  Red [ ]   Green [ ]

Play Results
Red              Green
1 [dist. or DQ]  1 [dist. or DQ]
2 [dist. or DQ]  2 [dist. or DQ]
3 [dist. or DQ]  3 [dist. or DQ]
4 [dist. or DQ]  4 [dist. or DQ]

○ PREVIOUS SCREEN                    ○ FRAME RESTART

FIG. 17

7. LEAGUE SCHEDULE SCREEN

SPRING 2019

| WEEK# | DAY | DATE | TIME | TEAM A | TEAM B | WON | LOCATION | COURT # |
|---|---|---|---|---|---|---|---|---|
| 1 | SUN | 5/17 | 12:00 | CASA | LDV | LDV | B.A.B.C. | 2 |
|   | SUN | 5/17 | 12:00 | WARRIORS | ULTIMATES | WARRIORS | B.A.B.C. | 1 |
| 2 |
| 3 |
| 4 |

9. LEAGUE STANDING SCREEN

SPRING 2019

| RANK | TEAM NAME | PLAYED GAMES | GAMES WON | GAMES LOST | % WON | FINAL TOTAL POINTS SCORE |
|---|---|---|---|---|---|---|
| 1 | LDV | 16 | 13 | 3 | .812 | 99 |
| 2 | WARRIORS | 15 | 12 | 3 | .80 | 83 |
| 3 | CASA | 20 | 12 | 8 | .6 | 69 |
| 4 | ULTIMATES | 16 | 9 | 7 | .562 | 70 |

FIG. 20

WIRELESS GAME MANAGEMENT SYSTEM

CROSS-REFERENCE TO RELATED APPLICATION(S)

This patent application is a continuation-in-part, and therefore claims priority from, U.S. patent application Ser. No. 16/506,370 entitled WIRELESS GAME MANAGEMENT SYSTEM filed on Jul. 9, 2019 (U.S. Pat. No. 10,940,379 issued Mar. 9, 2021), which claims the benefit of U.S. Provisional Patent Application No. 62/696,159 entitled WIRELESS GAME MANAGEMENT SYSTEM filed on Jul. 10, 2018, which is hereby incorporated herein by reference in its entirety.

FIELD OF THE INVENTION

The present invention relates generally to wireless game management systems.

BACKGROUND OF THE INVENTION

Many types of games involve, in one way or another, determining the absolute or relative positions of one or more game pieces, such as, for example, balls in a bocce game or other objects that are used for play in games such as used in lawn bowling, lawn darts, cushion shuffle board, curling, shuffleboard, horseshoes, petanque, or many other games. Typically, the absolute or relative positions are measured manually, which can be inaccurate, can result in game pieces being inadvertently moved, and can result in a slowing of game play.

SUMMARY OF VARIOUS EMBODIMENTS

In accordance with one embodiment, a wireless game management system comprises a plurality of game pieces, each game piece including a wireless module configured to transmit a location signal, and a wireless game management processor configured to determine the absolute or relative positions of at least two game pieces based on the location signals, determine a game status based on the absolute or relative positions of the at least two game pieces, and convey game status information through a user interface associated with the wireless game management processor.

In various alternative embodiments, the wireless game management processor may receive the location signals and determine the absolute or relative positions of the at least two game pieces based on the location signals. The wireless module of each game piece may determine an absolute or relative position of the game piece, and the location to signal transmitted by each wireless module may convey absolute or relative position of the game piece. Each wireless module may include a GPS receiver to determine an absolute position of the game piece. The wireless game management system may further include at least one beacon, wherein each wireless module may include wireless circuitry configured to determine an absolute or relative position of the game piece based on beacon signals from the at least one beacon. A designated game piece may determine the relative position of at least one other game piece, wherein the location signal transmitted by the wireless module of the designated game piece may convey relative position information. The game may be bocce, and the designated game piece may be a pallino ball.

The wireless module of each game piece may include a magnet that provides the location signal, wherein the wireless game management system may further comprise a plurality of sensors to determine the positions of the game pieces based on the magnetic location signals. The sensors may be hall effect sensors positioned under the field of play. The game pieces may be associated with at least two different teams of players, wherein determining the game status based on the absolute or relative positions of the at least two game pieces may comprise determining which team made a move in the game, which team should make the next move in the game, the score of the game, which team is leading the game, and/or which team won the game. Each wireless module may be configured to transmit identification information to the wireless game management processor, wherein the wireless game management processor may be configured to distinguish the at least two game pieces based on the received game piece identification information. The wireless module of at least one game piece may include an impact sensor and may be configured to transmit an impact signal to the wireless game management processor. The wireless game management processor may be configured to generate an electronic measurement fault signal (e.g., a human perceptible signal) when the absolute or relative positions of the two game pieces are determined to be equidistant to a reference location within a predetermined tolerance. Embodiments may further comprise a set of boundary elements, wherein each boundary element includes at least one sensor configured to sense the location of a game piece and to transmit location information to the wireless game management processor.

In accordance with another embodiment, apparatus comprises a wireless module for a game piece for a wireless game management system, wherein the wireless module comprises a power source; at least one antenna; and wireless circuitry powered by the power source and configured to determine, using the at least one antenna, an absolute or relative position of the game piece and to transmit a location signal conveying the absolute or relative position to a game management system processor of the wireless game management system for determining a game status.

In various alternative embodiments, the wireless module may include a GPS receiver. The wireless game management system may further include at least one beacon, and the wireless circuitry may be configured to determine the absolute or relative position of the game piece based on beacon signals from the at least one beacon. The wireless circuitry may be configured to determine the relative position of at least one other game piece and to transmit relative position information in the location signal. The wireless circuitry may be configured to transmit identification information to the wireless game management processor allowing the wireless game management processor to identify the game piece. The wireless module may include an impact sensor and the wireless circuitry may be configured to transmit an impact signal to the wireless game management processor based on the impact sensor. The apparatus may further comprise a game piece body in which the wireless module is disposed.

Additional embodiments may be disclosed and claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which:

FIGS. 5A-G show a user interface and screen displays that could be utilized for data input, system initiation and management, calibration, and statistical analysis and player or game related data display on a wireless or hard-wired device that is in communication with the wireless game management processor shown in FIG. 4.

FIG. 17 shows a sample Summary Outcome or Frame Point Tracker Screen in accordance with one exemplary embodiment.

FIG. 18 shows a sample League Schedule Screen in accordance with one exemplary embodiment.

FIG. 19 shows a sample Team Schedule Screen in accordance with one exemplary embodiment.

FIG. 20 shows a sample League Standing Screen in accordance with one exemplary embodiment.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

A "set" includes one or more members.

Exemplary embodiments provide a wireless game management system that is capable of determining positions of certain objects with other objects played. Such a system can employ RF, Bluetooth, cellular, Ultra Wide Band (UWB), GPS, Wi-Fi, NFC, or other wireless signals (e.g., microwave or other electromagnetic, magnetic, optical, or other signals) and systems using one or more antennas placed in proximity to the area in which the game will be played (e.g., antennae at court ends/corners or in proximity to the court surface) that can interrogate, monitor, and/or receive data from and between objects and measurement of relative position to other objects during game play. All balls including the smaller pallino used in Bocce, or other objects that are used for play in games such as used in lawn bowling, cushion shuffle board, curling, shuffleboard or many other games, may contain wireless transmitters or transceivers or magnets for use with Hall effect sensors, or infrared, ultrasonic or laser emitters for use with detectors adapted to be utilized in the wireless game management systems described herein.

Various exemplary embodiments of a wireless game management system are described below in context of the game of Bocce, although it is contemplated that modifications could be made to accommodate other games adapted to other game rules, player interactions, statistical measurements/analysis, and operating environments that are specific to the particular game without limiting the utility of the inventions described below.

Figure 1:
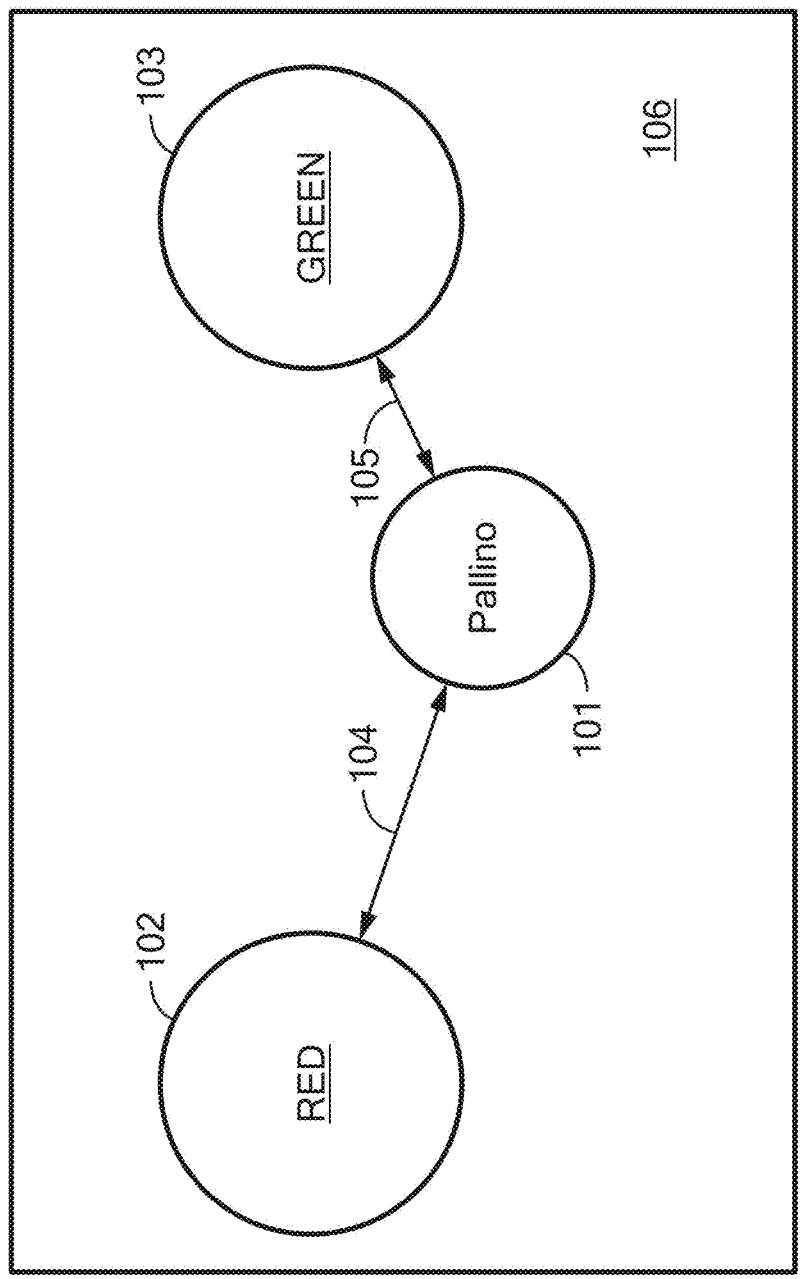
FIG. 1 illustrates one prior art system for conventional Bocce.

FIG. 1 is a schematic diagram depicting a traditional Bocce court 106 as known in the art. The size of regulation Bocce courts is typically 13' wide by 91' long. The court 106 typically includes side and end walls represented by the rectangular border. Generally speaking, a primary goal of the game of Bocce is for a player on one team (referred to in this example as team "A" or the "Red" team) to roll a bocce ball such that it ends up closer to a reference ball (referred to as a pallino 101) than a bocce ball rolled by a player on another team (referred to in this example as team "B" or the "Green" team). FIG. 1 shows a bocce ball 102 from a Red team ending up a distance 104 from the pallino 101 and a bocce ball 103 from a Green team ending up a distance 105 from the pallino 101. In some cases, a visual inspection can determine which ball 102 or 103 is closer to the pallino 101, while in other cases, the distances 104 and 105 are so close that a manual measurement must be taken in order to determine which ball 102 or 103 is closer to the pallino 101. Additional details of the game of Bocce are described below.

Typically, mass-produced tournament-approved bocce balls are made of a durable resin compound. While inexpensive wooden or light plastic bocce balls are available, the resin compound bocce balls are what serious players typically use. The two parts of a bocce ball are made in separate ways. The balls have a foam core, often constructed of molded pieces. The core gives the ball its weight. During manufacturing, the core is suspended inside a mold, and then liquid resin is poured into the mold. The resin creates the shell, the outside surface of the bocce ball. After cooling, the bocce ball is sanded, painted and polished. These balls do not currently contain electronics but could be modified or manufactured to incorporate a wireless system of the types shown and described herein. The game of Bocce, like other related field sports such as shuffle board and other games, typically involves manual measurement of distances. The game of Bocce can benefit from an automated system that avoids the delay of game from manual processes or the complexity of a camera system such as suggested in other systems.

The following is an overview of the game of Bocce in accordance with one set of rules, as a frame of reference. It is recognized that other games, and rule sets, could be modified and adapted to the inventions herein without limitation to the game of Bocce.

Bocce is generally played one-on-one (singles), pairs (doubles), or on up to eight players on each team. Singles are played with each person throwing 4 balls and alternating use of each end of the court. In doubles (pairs), each team member throws 2 balls, and again, alternate use of each end of the court. Teams of 3 or more members may divide up any way they choose, as long as no more than 4 team members are at one end. Teams need not have the same number of players.

Players are required to throw the pallino or bocce ball from behind a foul line. Players may step on but not have their foot completely over the foul line before releasing the pallino or the bocce.

The game generally begins with a flip of a coin between the captains of each team. The winner chooses either to go first, from a specific starting end, or selects the color of balls it wants to use. A member of the team that wins the coin flip tosses the pallino 101 into the court. The toss of the pallino is considered valid if the pallino passes a center line of the court and does not touch the back wall on the opposite end of the court. If the first team fails to place the pallino in a valid area, the opposing team will attempt to put the pallino in play. If the opposing team fails, the pallino returns to the original team for an additional attempt. If this attempt fails, the pallino is placed half way between the mid-court line and the back wall. The Team that originally tossed the pallino plays the first ball.

The first ball must be rolled by the member of the Team who threw the pallino. Should the rolled ball hit the backboard without touching the pallino, it is a dead ball and removed from the court. The same Team must throw again and continue rolling until a valid point is established. Once the point is established, the opposing Team must point or shoot until they make a new (closer) point. Players may use side boards at any time. Balls can be measured at any time and, in case of doubt, an impartial person should be called on. In the event a tie is determined, the last Team to roll a ball must roll again until the tie is broken. If, after all balls are played, there is still a tie, no points are awarded and play resumes with the Team last scoring tossing the pallino from the opposite end of the court. In the event one or more balls are moved during measurement by a non-playing person, the balls are returned by that person to approximate positions. If however, a member of a Team currently playing measures and moves a ball, the point is awarded to the opposing team. In any case, the decision of the non-playing person is final. One Team Member can cross the centerline to measure balls. Other players need to remain at their respective end of the court.

If a ball hits the backboard without first touching another ball or pallino, it is a dead ball and removed from the court. If a ball is shot, hits the backboard illegally, and then strikes a stationary ball/s, the shot ball is removed from the court and the stationary ball(s) are placed in their approximate original position(s). The pallino is always a valid target and remains in play even if it strikes the back wall after being struck by any valid ball during a frame. If however, the pallino is knocked out of the court or bounces back in front of the center line, the frame is considered void and the Team that started the frame will begin again at the opposite end of the court. In the event ball/s resting against a backboard are moved as a result of a valid shot, they remain in their new position. If however they move as a result of an invalid shot, they are returned to their approximate original positions.

Only one team scores in a frame (unless there is a tie). Games are played to mutually agreed point total (e.g., 6 point games are good for regular play, with 12 or 15 for finals in a tournament).

Players should never touch or move any ball or the pallino until frame has ended. If a player moves a ball prior to the end of a frame (thinking play is over) and the balls cannot be accurately relocated to their positions, all remaining non-thrown balls of the non-offending team are counted as points. If the offense is committed by the playing team, all non-thrown balls of that team are voided and the frame is over.

There are three (3) types of shots:
Punta: A pointing shot where the player rolls their bocce to get close to the pallino. Pointing is done with either foot or both feet before or on the pointing foul line. A throw is valid as long as any part of the foot/feet is on the line.
Raffa: the act of shooting at a target in a forceful manner, intending to move other balls or the pallino. Must be rolled or thrown before passing the pointing foul line.
Volo: the act of lofting the ball in the air attempting to hit the target on the fly. Must be thrown before passing the hit line. Except in special circumstances we will not be using this shot.

If a player plays the wrong color ball, simply replace it with the correct color when it comes to rest. Play continues. If a player rolls/shoots out of turn or plays more balls than allowed, the opposing team has two (2) options. Leave all balls as they rest, or remove the illegally thrown ball from play and return all other ball/s to previous position/s.

In exemplary embodiments, wireless modules are inserted or otherwise embedded into the bocce balls and pallino. In some embodiments, the wireless modules may be transmit-only modules (i.e., only capable of transmitting signals), while in other embodiments, the wireless module may be transmit/receive modules (i.e., being capable of both transmitting signals and receiving signals). In some embodiments, the wireless module includes a passive transmit element (e.g., magnet), while in other embodiments, the wireless module includes an active transmit element. Some exemplary wireless modules are described below. Wireless signals transmitted by the bocce balls and pallino are used directly or indirectly by a wireless game management processor to determine the positions of the bocce balls and pallino and overall game status based on the wireless signals.

As discussed in more detail below, the sequence of play for Bocce is generally as follows, which can be adapted using the inventive concepts of the wireless game management system described herein.

1. Game length in points is entered into system. Assume Team Red wins the honor to throw the pallino and so informs system. The pallino must come to rest past the mid-court line, but may not touch the court end-board. If initial throw does not satisfy this condition, system calls for team Green to throw the pallino. This cycle continues until a valid pallino throw is obtained, at which point, system informs team Red to commence play by throwing their first ball, Red 1. A throw is invalid if it hits the end-board without first hitting and displacing the pallino or other balls. The invalid ball is removed from the court. Team Red continues until a valid throw is made.

2. System records and displays distance from pallino of Team Red's first valid throw, noting it as a potential scoring point. System now calls for team Green to throw their first ball, Green 1. System records and displays Green 1 distance from pallino. If Green 1 is closer to the pallino than Team Red's closest ball, system notes potential point and calls for Team Red to throw their next ball. If not, Team Green must continue throwing until they either achieve closest position, or run out of balls. This cycle continues until all 8 balls are thrown. System records and displays any ball displacement with updated positions and potential scoring points. All of this activity is termed Frame 1, whose final score is recorded and displayed.

3. System now calls for the winner of Frame 1 to commence frame 2, throwing from the opposite court end. When Frame 2 is completed system records and displays cumulative score and calls for frame winner to continue from opposite end. Play continues until one team reaches the agreed upon Game length in points. System displays, records, and announces Game Winner, accompanied by appropriate trumpet salute or other message.

Figure 2:
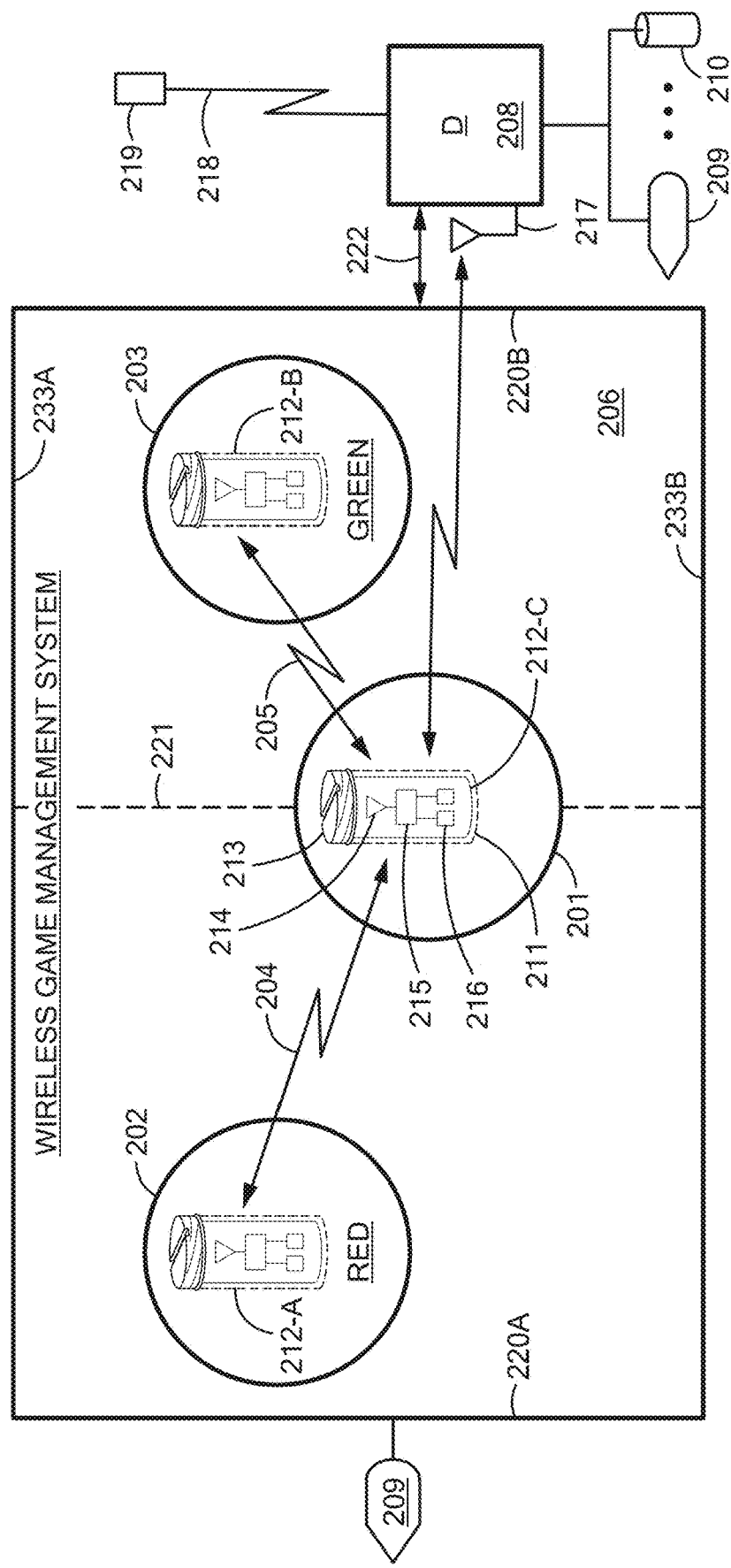
FIG. 2 illustrates a preferred embodiment of the inventions herein utilizing wireless signals incorporating GPS or other locational determinant systems and integrated wireless modules connected to a wireless game management system.

FIG. 2 is a schematic diagram showing a wireless game management system as applied to the traditional game of Bocce, in accordance with one exemplary embodiment. It is contemplated that various other games could be adapted to this system beyond Bocce, including lawn bowling, curling, shuffleboard, petanque, and many other games that can benefit from the inventive concepts herein.

In FIG. 2 is shown bocce court 206, pallino 201, Bocce "RED" 202, Bocce "GREEN" 203, and wireless game management processor 208. Note for reference that the typical diameter of the bocce balls is 4.2" and the Pallino is 1.5".

Further are shown wireless bocce links 204 and 205, and wireless system link 207. These communication links are preferably bidirectional and capable of communicating information between the red and green balls 202/203 and the pallino 201, and between the pallino 201 and the wireless game management processor 208 via at least one antenna 217, as well as directly between red and green bocce balls 202/203 and processor 208 and the at least one antenna 217 (these links are not illustrated for convenience). In other modifications of the inventive concepts herein, red balls 202 and green balls 203 could communicate directly with wireless game management processor 208 via at least one antenna 217 or other sensors not shown such as a grid of hall effect sensors proximate to the court 206, to be described in greater detail later. Additionally, wireless link 218 is in communication with wireless game management processor 208 to provide data input and output from and to a portable wireless handheld game device 219. The wireless game management processor 208 can store various types of information in data storage 210.

In one exemplary embodiment, before game play, each team checks out and registers four of the same colored bocce balls. One team, team red for example, may choose red balls and the opposing team, team green for example, may choose all green balls. Different colors are used traditionally in order to visually distinguish one team from the other.

Adapted to the inventive concept shown in FIG. 2, each individual ball contains a wireless module 212 that may be permanently integral to or removable from the red and green balls shown in 202, 203 and pallino 201 (e.g., wireless modules 212-A, 212-B, and 212-C, respectively). As discussed in more detail below, each wireless module may reside in a module cavity 211 and may include a module retainer 213 (e.g., to retain a removable wireless module within the ball), an antenna 214, wireless circuitry 215, and a power source 216. Each ball may have a unique identifier that can be conveyed wirelessly, e.g., for use by the wireless game management processor 208 in distinguishing the different balls and identifying the locations of the different balls. The unique identifier can be, for example, different wireless frequencies, different digital information, or other distinguishing data or characteristic that can be transmitted wirelessly by the balls.

Particular game plays may be associated with detection of the particular red or green ball as electronically encoded in wireless module 212 and any associated player or team for statistical analysis, measurement, scoring, and to develop over time statistical measurements of particular player performance such as is commonly seen in professional sports such as baseball with RBI, or football such as Average rushing yards, etc. A standard nomenclature could be employed that assigns any electronic signature associated with individual balls such that, for example, all red bocce balls 202 could be associated with an even number color/ball identification digit electronically encoded in wireless module 212 contained in a red ball 202, and all green bocce balls 203 could be associated with an odd number color/ball identification digit similarly encoded in wireless module 212 contained in a green bocce ball 203. As well, to distinguish the Pallino 201 from red and green bocce balls 202/203, the Pallino 201 could be associated with a color/ball identification digit of "zero". This ball identification scheme would be useful in differentiating various balls from one another when associating with a particular turn of play and statistical measurements etc. as discussed further herein.

This check-in procedure may occur in a centralized location such as a club house adjacent to the bocce court and data entry of player or team information can occur at check-in utilizing display 209 and an input device such as a touch display, keyboard, voice input or mag stripe, IR or RF wireless scanner of a club membership card or badge. Display 209, wireless device 219, or other marquis type public displays or displays connected to a private connected network could display real time game play, scoring, player statistics, betting odds or other information useful to spectators or other players. A display system 209 could be a large publicly viewable display and custom programmed with game specific information that could be integrated at one or both ends of bocce court 206, such as currently available by Renewed Vision (https://renewedvision.com/propresenter-scoreboard/) or other similar systems, in communication with and connected to the wireless game management system.

Alternatively, the check-in procedure could employ a wireless device 219 such as an iPad, cellular phone, laptop computer or similar touch display device in communication with wireless game management processor 208 using wireless link 218, which could be wifi, cellular or other wireless systems adapted for communication. Upon check-out, upon the players' return of the Bocce equipment, the system in FIG. 2 can dissociate the player/team data previously associated with the unique identifiers contained in the 201, 202 and 203 balls, to be re-associated with new players or teams upon the next check-in event.

Each ball 202 and 203 and pallino 201 typically contains a unique identifier encoded in the wireless module that can be associated with a particular team or player, a particular throw, an event associated with the time and date and/or sequence that ball was played, and other information such as the proximity with the pallino or wireless game management processor 208, specific location within bocce court 206, with other players' balls on the court, or statistical analysis associated with a particular game, a ball color/type identifier as discussed briefly above, a particular team or individual players.

After system initialization, a team must throw the pallino 201 successfully past the mid-court line without touching the court end-board in court 206. The court end-board detectors 220A and 220B at each end of bocce court 206 and in communication with the game management processor 208, e.g., via a hard communication link 222 attached to game management processor 208, could be used to determine when a throw of the pallino was invalid due to touching the detector surface and alert the wireless game management system that the throw was invalid, prompting players via display on display 209, 219 or by annunciation to the field to commence a successive throw of the pallino. Display on handheld game device 219 could receive a variety of information, including real-time video of game play, team, player or ball frame statistics or measurements, statistical analysis related to the game, or other information facilitated by a custom application, e.g., written for the iPhone or Android cellular phone platform.

The system also can include a center court detector 221 in communication with Game management processor 208, e.g., via communication link 222, and used to establish that a throw of the pallino has crossed the center field in order to automate the game play, although it is usually apparent from visual inspection whether or not the pallino crossed the center field. A variety of wireless techniques could be employed for the center court detector 221 such as light beam (e.g., visual or infrared) that could be projected from one side of the field across mid center field and monitored via an "electric eye" that is positioned at the midfield center line on the other side of the field. This sensor could be initiated upon the first throw of the pallino triggered by the commencement of game play, and then disregarded or turned off by the wireless game management system and processor 208 thereafter when a successful pallino throw has been registered by the system. Upon the condition of the pallino breaking the line of sight of the sensor, it would be determined that the pallino was eligible to be counted as a valid throw, if the throw did not trigger an end of court condition by court end-board detector 220A or 220B.

Alternatively, other wireless techniques or impact sensors could be employed in communication with electronics contained in wireless module 212 to establish a bonafide play of the pallino 201 or bocce 202 and 203 in relation to the court 206, court end-board detectors 220A/B, and center court detector 221. Wireless module 212 could also utilize similar wireless techniques or impact sensors in the bocce balls 202 and 203 in any of a variety of ways to determine interaction between the bocce ball and another object (e.g., another bocce ball, the pallino, a court end-board 220A/B, or a court side board (223A/B), the position of the bocce balls on court 206, or in direct communication with game management processor 208 using a wireless system link (similar to wireless system link 207) between bocce balls 202 and 203. For simplicity of illustration, such wireless system links are not shown between bocce balls 202 and 203 but are contemplated as being an alternative embodiment, depending upon system performance parameters and other factors that may affect system design.

The wireless game management processor 208 may employ at least one or more wireless antennas 217 to communicate with wireless modules 212 to determine the precise position of the pallino 201 and/or bocce 202 and 203 and to ensure that the pallino is valid for play, or conventional visual techniques can be used such as a mid-court reference point that can easily determine the position of the pallino. The wireless game management processor 208 may utilize one or more wireless antennas 217 to communicate with wireless modules 212 contained in Bocce balls 202 and 203 thrown by team Red and team Green. Various techniques could be adapted in order to establish the initial location of the pallino. For example, it is contemplated that more than one antenna 217 could be located in proximity to Bocce court 206, and they could interrogate the circuitry contained in the wireless module 212 utilizing triangulation and field signal strength techniques with wireless signals such as seen in bluetooth, GPS or other wireless protocols and wireless transceiver systems to improve accuracy of the system for determination of field position of particular balls played. Side board detectors 223 A and 223 B could also be connected to processor 208 and could register use of the sideboards by particular players during game play, for statistical analysis of player style profiles. Impact sensor detectors contained within wireless modules 212 can similarly be used to register how often a player's bocce comes in contact with another players bocce to dislodge their position from the proximity of the pallino, again useful for statistical analysis and prediction of a particular players response to field position, etc.

Accurate distance measurement using RF techniques has been described in U.S. Pat. No. 6,859,761 issued to Bensky et al. and also in U.S. Pat. No. 7,868,815 issued to Fukagawa et al, both of which are incorporated by reference. A number of other techniques could be employed that are known in the state of the art. Other 2D location systems such as available by BeSpoon include device centric and server centric solutions using triangulation that could be adapted to the invention herein and are incorporated by reference. See: http://spoonphone.com/en/home/13-standart-evaluation-kit-with-bespoon-protocol.html. Other wireless technologies that could be adapted and employed in this system could include GPS, cellular, wide band wireless, bluetooth or other methods and may also include approaches such as seen in Heuel & Loeher http://www.localino.net/and in a system known as LIPS (local indoor positioning system) offered by Multi-LUX https://www.multiluux.eu. It is recognized that due to environmental or system limitations based upon the technology employed for wireless interrogation, there will be varying levels of accuracy. In some cases, each ball can determine its own absolute or relative position (e.g., using GPS, signals from one or more beacons associated with the wireless game management system, signals from the pallino, etc.) and report its position to the wireless game management processor. For the game of Bocce, it is believed that a measurement accuracy of 5 mm would be acceptable, although even accuracy of less than that (e.g., greater than 5 mm) would be helpful to limit the number of times manual intervention for distance measurement must occur, thereby helping to speed the rate of game play by automating the measurement and scoring system, thereby decreasing the duration of game play, reducing the opportunity for disagreement during calculation and scoring, and increasing the player and spectator satisfaction and enjoyment.

Figure 10:
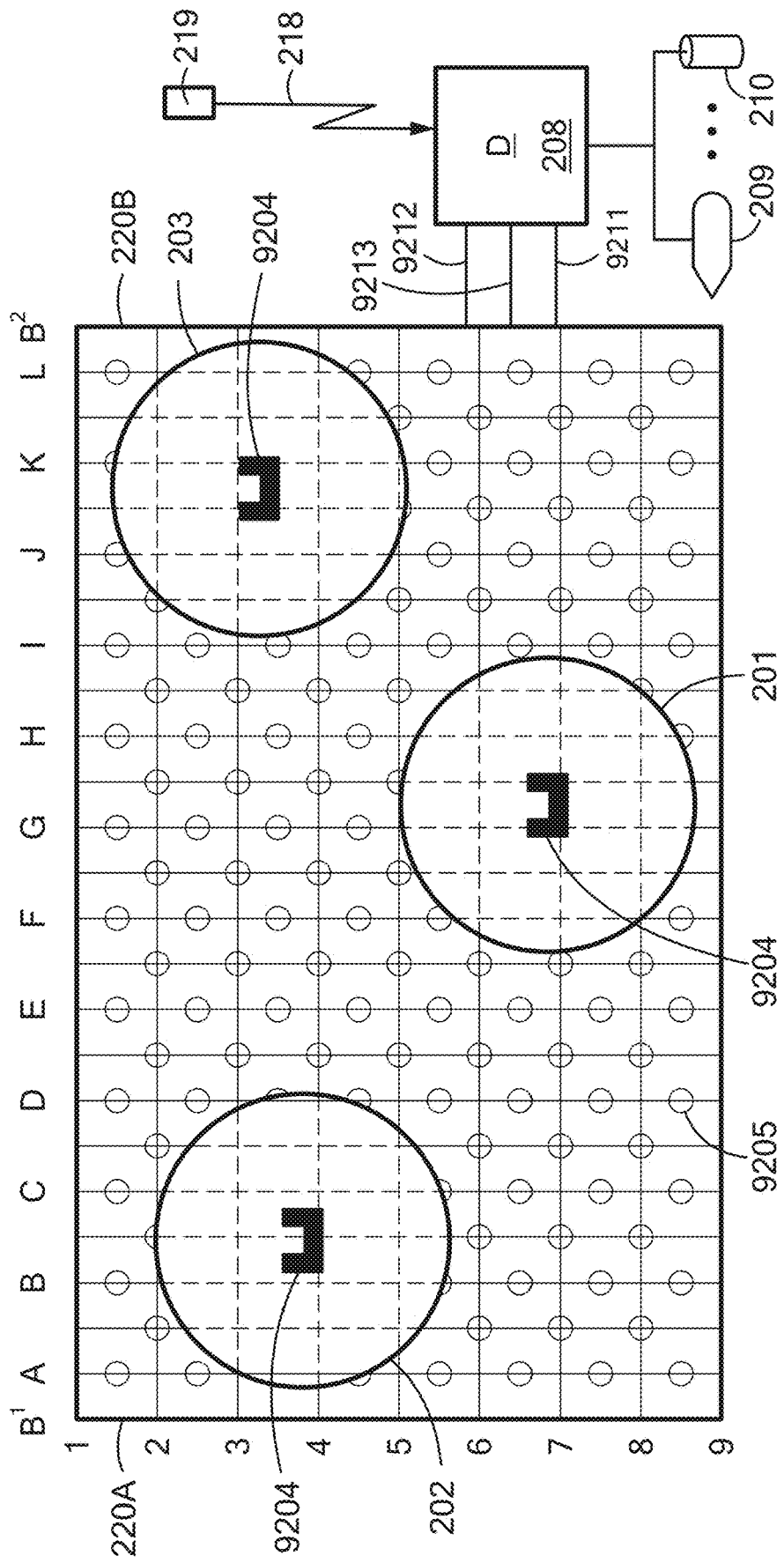
FIG. 10 illustrates another preferred embodiment of the inventions herein utilizing integrated magnets, magnetic fields and a Hall Effect Sensor array connected to a wireless game management system.

In an alternative embodiment, it is contemplated that the wireless game management processor 208 could be in communication with a grid of hall effect sensors placed adjacent to the playing surface of bocce court 206, for example, as shown schematically in FIG. 10. This embodiment could utilize electromagnetic fields created by balls in play in order to determine the relative position of the pallino 201 and the bocce balls 202 and 203 that contained magnets positioned at dead center.

In one example, the red balls 202 and the green balls 203 and pallino 201 contain a magnet 9204 at the dead center of the balls. Bocce court 206 is shown in FIG. 10 in which a grid of hall effect sensors 9205 are placed in an XY coordinate system shown as rows 1-9 and columns A-L and installed adjacent to and preferably below the playing surface in connection with game management processor 208 via hard communication links 9212 and 9213.

It should be noted that a group of hall effect sensors 9205 for all or a portion of playing court may be provided as a unit, e.g., as a sheet or roll of material that can be placed on surface and connected to the game management processor 208. It is contemplated that multiple such sheets or rolls of material containing subsets of hall effect sensors 9205 can be provided for placement on a surface and connected directly or indirectly (e.g., through one or more other sheets or rolls) to the game management processor 208 in order to provide sensor coverage for an entire playing surface. Such sheets or rolls can be placed on a surface and then covered by a playing surface material to create the actual playing surface on which the game is played, and with the hall effect sensors placed adjacent to and just below the playing surface.

These links may provide for data transmission from a particular hall effect sensor 9205 and also to provide power to the sensors. The hall effect sensors 9205 could be similar to the DRV5023 Digital-switch hall effect sensor manufactured by TI or the Alegro A13xx radiometric linear hall effect sensor ICs that provides a voltage output that is proportional to the applied magnetic field. Upon detection of a ball in play through the court surface, the magnetic field strength can be measured and based upon the strongest detected signal, a correlation between the ball location and the particular area of the grid array and sensor 9205 can be determined by processor 208. Using a correlation between magnetic field strength and an associated voltage output, a calculated distance may be determined and logged by the wireless game management system for nearest ball determination, point calculation, statistical analysis, and other purposes.

Figure 11:
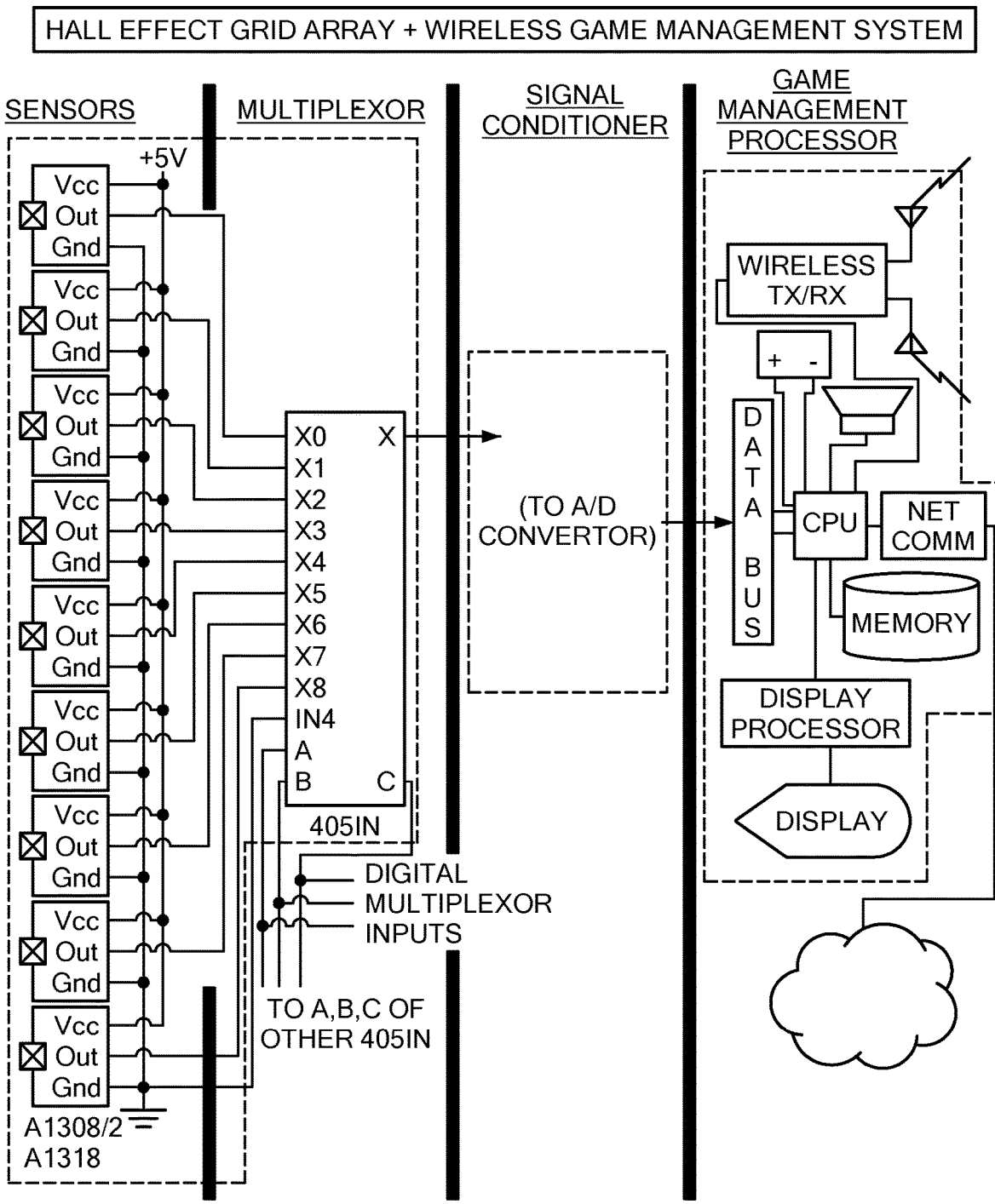
FIG. 11 is a schematic diagram of circuitry for Hall Effect Sensor array embodiments of the type shown in FIG. 10, in accordance with one exemplary embodiment.

FIG. 11 is a schematic diagram of circuitry for Hall Effect Sensor array embodiments of the type shown in FIG. 10, in accordance with one exemplary embodiment. Here, the Hall Effect Sensors are coupled through a multiplexor and a signal conditioner to the game management processor, which provides signals via the digital multiplexor inputs to control the multiplexor to receive inputs from the Hall Effect Sensors in a predetermined sequence, e.g., cycling through X0 to X8 in a sequential round-robin fashion. It should be noted that additional multiplexors having similar connections generally would be included to accommodate a larger number of Hall Effect Sensors in the array. These multiplexors could be daisy-chained to allow for cycling through all of the Hall Effect Sensors in a sequential round-robin fashion. The game management processor can use the signals received from the hall effect sensors to determine the absolute or relative position of at least one game piece, e.g., using the known absolute or relative positions of the hall effect sensors and signal strength measurements obtained from various hall effect sensors (e.g., using triangulation to estimate the location of a game piece). In any such embodiment, an array of sensors can be embedded in or under the playing surface, e.g., by placing the array of sensors on a subsurface and then covering the array of sensors with the playing surface material (e.g., grass, artificial turf, clay, sand, crushed stone, crushed seashells, concrete, resin such as described for example in U.S. Pat. No. 9,174,112, ice such as for curling, or other appropriate court surface. In some cases, one or more rolls or sheets containing sensors can be used as the court surface. In order to help distinguish different game pieces (e.g., the pallino, first team balls, and second team balls), the different types of game pieces can include different strength magnets, magnetic field strengths, or magnetic field patterns (e.g., produced by electromagnets rather than fixed magnets in the game pieces). For example, one set of game pieces may use magnets with a first strength, and a second set of game pieces may use magnets with a second strength. It should be noted that, even if all balls in a bocce game use magnets of the same strength, the pallino ball generally will produce a stronger magnetic signal at a Hall effect sensor compared to one of the other bocce balls at a given distance because the pallino is smaller and therefore the magnet at the center of the pallino will be closer to the sensor. In some embodiments, this inherent signal strength difference can be used to help differentiate between the pallino and other bocce balls.

Additionally, end of board sensors 9211 may be present and in connection with game management processor 208. In one example of play the pallino 201 is thrown and hall effect sensor array determines in connection with processor 208 that the position at rest of pallino 201 is past the center court line at coordinate G7. It also determines that end of court detector 220 has not been activated, thereby constituting a valid throw of the pallino.

Team Red then throws Bocce Red 202 and the hall effect sensor array determines the resting position of the ball to be at C4. Team Green then throws Bocce Green 203 and the hall effect sensor array determines the resting position of the ball to be at K3. Based upon known distances predetermined by the particular spacing of the X and Y coordinates of the array, Processor is then able to calculate the coordinates of all three balls on the field and determine the nearest location to the pallino 201 to be in this case the Green bocce 203. This information can be stored by processor 208 in storage device 210 and also displayed on displays 209 and displayed or stored in wireless device 219. Such data indicating the coordinates may be time and date stamped to establish and record the game play of a particular match, team or player for later statistical analysis and for real-time display for spectators and players during the game.

Alternatively, pallino 201 could contain a hall effect sensor 9205 that is contained and connected to wireless transmission circuitry in a wireless module 212 such shown in FIG. 2 and located at dead center of the pallino. That hall effect sensor could determine the relative distance from a red or green ball 202 and 203 that has landed nearby based upon the relative magnetic field of both opposing balls. Positioning the sensor and magnets at dead center would ensure that irrespective of the rotation of the balls, a consistent relative distance between the pallino and the game balls could be determined based on the magnetic field strength detected by the hall effect sensor. The transmission circuitry of the wireless module 212 then communicates with processor 208 via antenna and wireless connection (not shown in FIG. 10 for convenience).

Figure 3:
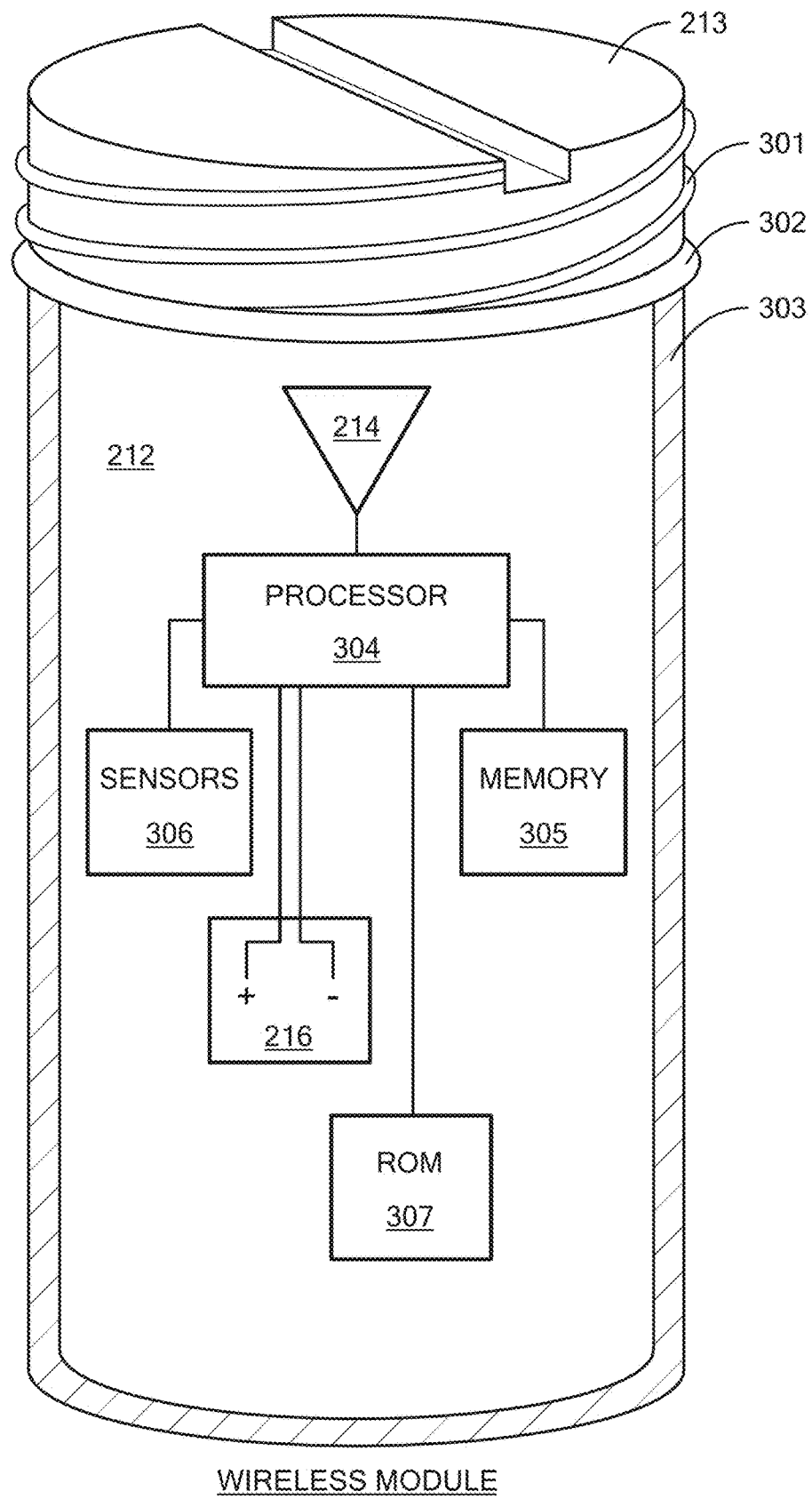
FIG. 3 illustrates a wireless module that may be integrated into an object such as ball used in Bocce or other game objects.

FIG. 3 is a schematic diagram showing components of a wireless module, in accordance with one exemplary embodiment.

A removable module 212 is shown with optional outer case 303 that may be inserted into a suitable recess or module cavity 211 in a ball. Module 212 may allow for retrofitting existing balls by drilling pallino 201 and red and green balls 202 and 203 to a position of dead center in the ball and inserting a wireless module 212 into a module cavity 211 in the ball, with a module retainer such as a threaded insert 301 that is received in the ball, or a glued fitment, or utilizing a rubber friction fit 302, or other means to ensure that module 212 remains positioned in the ball without affecting the outer surface of the ball for play. The module 212 may be also be permanently contained within a ball during manufacture, in systems and circuits that can be recharged to wirelessly, or receive sufficient energy from interrogation by a transceiver or other circuit from wireless game management processor 208 and antenna 217 similar to a product manufactured by BeSpoon, model BSP-UWBA-Pal which is a Ultra Wide Band directive 90 degree antenna, or some other means employed beneath the playing surface that is proximate to the ball located on the court. The outer surface of the module shown in 213 can be adapted to have the same curvature and material as the curvature of the balls shown in 201, 202 and 203 and aligned to minimize any interference with ball play. RFID and/or GPS circuitry could be utilized such as seen in U.S. Pat. No. 6,998,965 which is incorporated herein by reference or as discussed herein with other systems that employ multiple antennas to improve accuracy as is known in the art and discussed herein to improve accuracy and granularity of the measurement systems.

The module 212 and wireless circuitry 215 shown in FIGS. 2 and 3 may be encoded with a unique identifier associated with a particular ball and/or set of balls, a ball color (Red, Green, etc.) or type (Bocce or Pallino), a club location or other useful information for game play such as, for example, a particular team and/or player. This information may be stored in a ROM 307, RAM or PROM, hardwired, or stored in some other memory 305 connected or integral with wireless module 212 contained in the ball. That identifier may then be electronically associated with a particular team or player upon check-in and/or prior to game play. For example, if a particular ball or set of balls in 202 is encoded with, for example, "Belaire Bay Club—RED 1567" a particular team name such as "RED TEAM RUTLEDGE", and individual player such as "BILL RUTLEDGE", the time and date of scheduled play or other play or player specific information can be entered utilizing data input connected to wireless game management processor 208 and associated with that particular ball or set of balls upon check-in or at any time before play occurs.

One such chipset package that could deliver some of the functionality for module 212 is manufactured by Silicon Labs, and is the Blue Gecko BGM121 and is only 6.5 mm×6.5 mm×1.4 mm and contains an integrated antenna, ARM processor, Bluetooth 4.2 compliant communication and passive components that reduce the form factor and BOM, in a low energy device that is programmable.

Optionally, before each game throw, the individual player, person officiating the game or other team member can select from team members previously stored upon check in to associate that particular play with that player making that play. For example, using a touch screen with simple red and green options, the particular player could be selected immediately prior to play so that data pertaining to that throw would also be associated with the selected player from amongst several players on team red or team green that had previously been registered upon check-in. According to the invention herein, that data could then be stored at Wireless game management processor 208.

Wireless Game management processor 208 may receive and store the team and/or player or other information with the associated unique identifier information correlating to a particular pallino, a particular red or green ball 202 or 203 or a set of red or green balls as in 202 and 203 played, that has been used during the check-in process. This associated information can be saved in storage device 210, which may be used during game play by Processor 208 and/or wireless device 219 for real-time measurement of respective balls in relation to each other or to the pallino 201, for point scoring purposes, for real time analysis for sports betting, and also afterwards for statistical analysis or other purposes.

Memory 210 may be a solid state memory, a conventional optical or hard disk drive, cloud storage or other storage medium in connection with wireless game management processor 208. Various information such as team name, player name, and other information can be associated with the specific balls checked out, and this information may be stored upon data entry at the wireless game management processor 208 and optionally also within reprogrammable memory 305 in module 212.

Further shown in FIG. 3 is an antenna 214, that can be integrated within the wireless module 212 or be a separate connected antenna, adapted to receive bandwidth-specific wireless signals such as bluetooth, RFID, Cellular, GPS or other wireless signals (e.g., microwave) from wireless game management processor 208, connected with transceivers or antennas 217, or may also receive information from other wireless modules 212 contained in balls shown in 201, 202 and 203 in a system adapted to do so.

Processor 304 may be an ARM Cortex-M4 processor such as utilized by Silicon Labs or a variety of other processors uniquely adapted to accommodate a small form factor, low power consumption and other requirements such as used for wild game tracking, wearable articles or applications that will allow for determination of location of a particular object as it relates to other known locations.

One such solution that has been identified is manufactured by Silicon Labs model SLTB001A known as the Thunderboard Sense complete sensor-to-cloud development kit. It is a small platform for battery operated applications, and includes wireless connectivity, cloud connectivity, motion sensing and other sensor input, and also mobile applications, which is programmable and could be adapted for use because of its multi-protocol radio and on board sensors.

Sensors 306 may also be connected to Processor 304 in Module 212 that may detect collision with the backboard or with other balls (e.g., a piezoelectric sensor, an accelerometer, a contact sensor, or other appropriate sensor), speed of rotation (e.g., a gyroscope or other rotation sensor), or other events that are detectable and useful in the improved system. For example, a sensor could be utilized to place the wireless circuitry into a powered state upon detection of a throw, collision with another object after a throw, or upon detection of a wireless interrogation signal received by antenna 214 and processor 304.

Another example of a sensor-based event that would be particularly useful would be a circuit that detects the battery level of the power supply 216 contained in wireless module shown in FIG. 3. A sensor circuit using software and/or hardware attached to or resident within processor 304 can periodically or upon interrogation determine the remaining battery condition before, during or after play. In the event the electrical current in power supply 216 is detected as too low by processor 304 and sensor circuit 306, a signal may be generated and transmitted wirelessly by antenna 214 to game processor 208 in FIG. 2. Upon receipt of a wireless signal indicating a low power condition in the wireless module, there may an audible or visual alert generated to a player or game official on any number of displays or announcement means provided in the system. This will allow the player or game officials to substitute the low power condition ball with another fully charged ball that may be registered to the player in place of the original ball. Or it may allow a player or game official to change out the module or battery in the preexisting ball prior to playing again to avoid having to re-register another ball. In any case this useful feature will avoid a condition where the ball cannot operate mid game or during subsequent plays when the power will be too low for proper operation. Such a power interrogation routine could also be initiated manually from an operator connected to the game processor or automatically on a periodic basis with software that runs on the game processor 208.

One such sensor that could be useful for power management applications could be similar to the TDK InvenSense ICM-20648. This device is a 6-axis MEMS Motion tracking chipset that could be utilized to detect the rotation of a ball in play, and could be utilized in a number of different ways. For example, upon detection of rotational motion, a circuit could be triggered that would awaken a transceiver circuit in wireless module 212 to interrogate or transmit data upon detection of a state of rest after movement, using wireless positional data as determined by a hall effect sensor or radio triangulation with other objects detected in proximity, and then time-out after transmission. A number of other novel applications are contemplated that would be useful in the inventive system herein.

Figure 4:
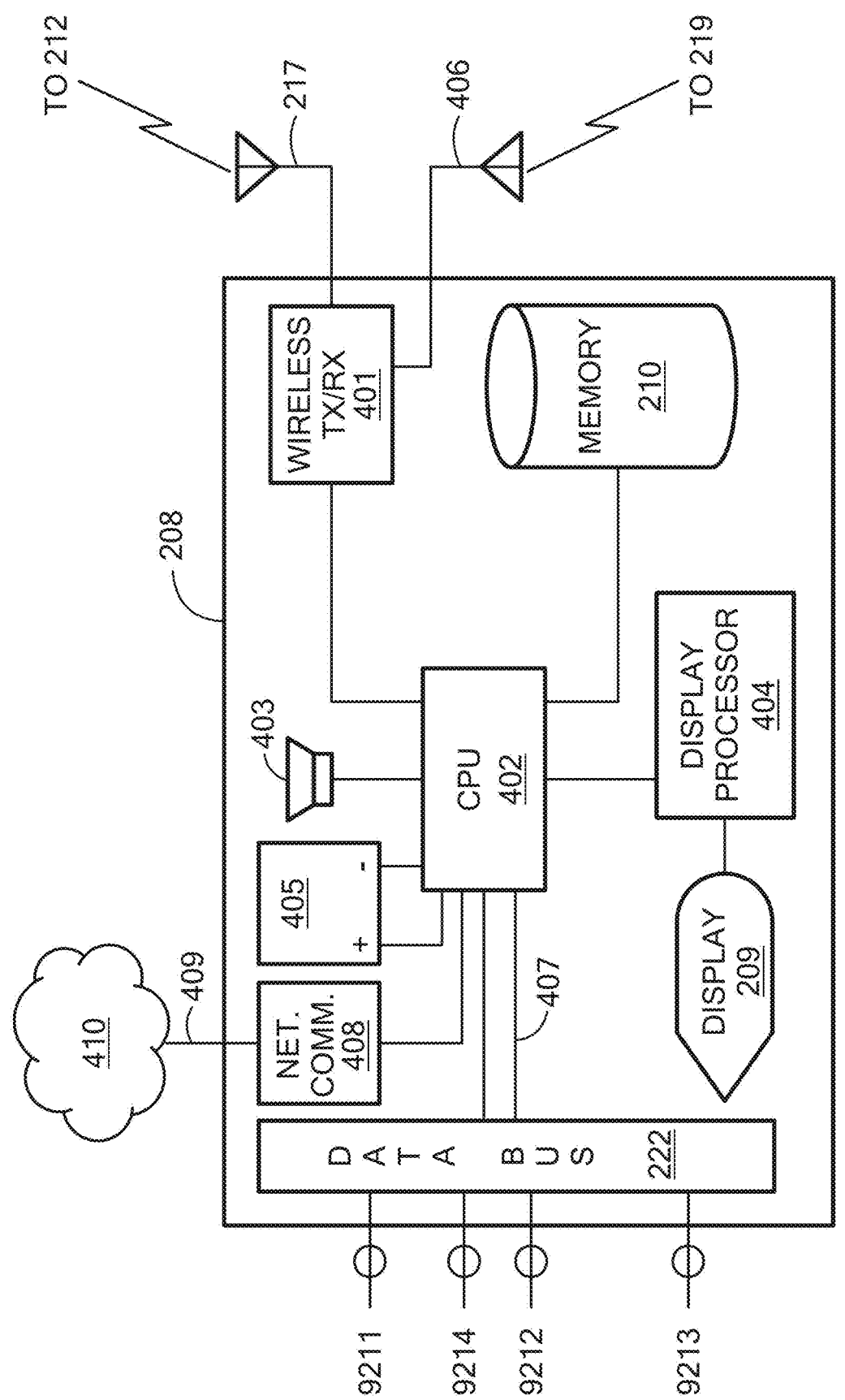
FIG. 4 illustrates a wireless game management processor adapted to the inventive concepts discussed herein.
Figure 5G:
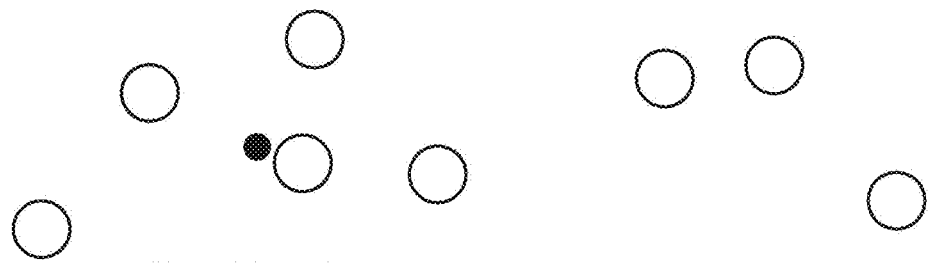

FIG. 4 is a schematic diagram depicting a game management processor 208 as described in FIGS. 2, 10, and 3, in accordance with one exemplary embodiment.

Game Processor 208 contains at least CPU 402, memory 210, wireless transmitter and receiver 401, one or more antennas 406 and 217, annunciator output 403, power supply 405, network communication module 408, network interface 409 that may be connected to cloud 410, data bus 222 (e.g., part of the hard communication link 222), display processor and interface 404 and display 209. It also may contain communication links 9211 for side and end-of board sensors, communication link 9212 and 9213 for grid based sensors in an array as shown in FIG. 10, and video camera input 9214.

Wireless transmitter and receiver 401 may be capable of both communication with cellular wireless devices as in 219, and wireless systems in communication with antenna 217 connected with court 206, and game balls 201-203, and also could include a wireless link with the sensor grid array in FIG. 10, side and end-court sensors 220 and 223, video input, or other input. It may comprise one or more wireless transmission protocols such as cellular, GPS, ultra-wide band, RF, wireless signal processors and one or multiple antennas adapted to the particular requirements of the user.

Video camera input 9214 can be utilized to provide input from cameras positioned over the court, such as seen in US 20150146003, to provide additional on-screen video display information of the game play and/or ball position that may be stored in memory 210, and shown on display 209, wireless device 219 or larger publicly viewable displays such as discussed earlier in this application. This video of the game play and position can be shown in conjunction with the data determined from wireless measurement techniques to as discussed and shown in FIGS. 2, 10, and 3.

FIGS. 5A-G show a user interface and screen displays that could be utilized for data input, system initiation and management, calibration, and statistical analysis and player or game related data display on a wireless or hard-wired device that is in communication with the wireless game management processor shown in FIG. 4.

Figure 6A:
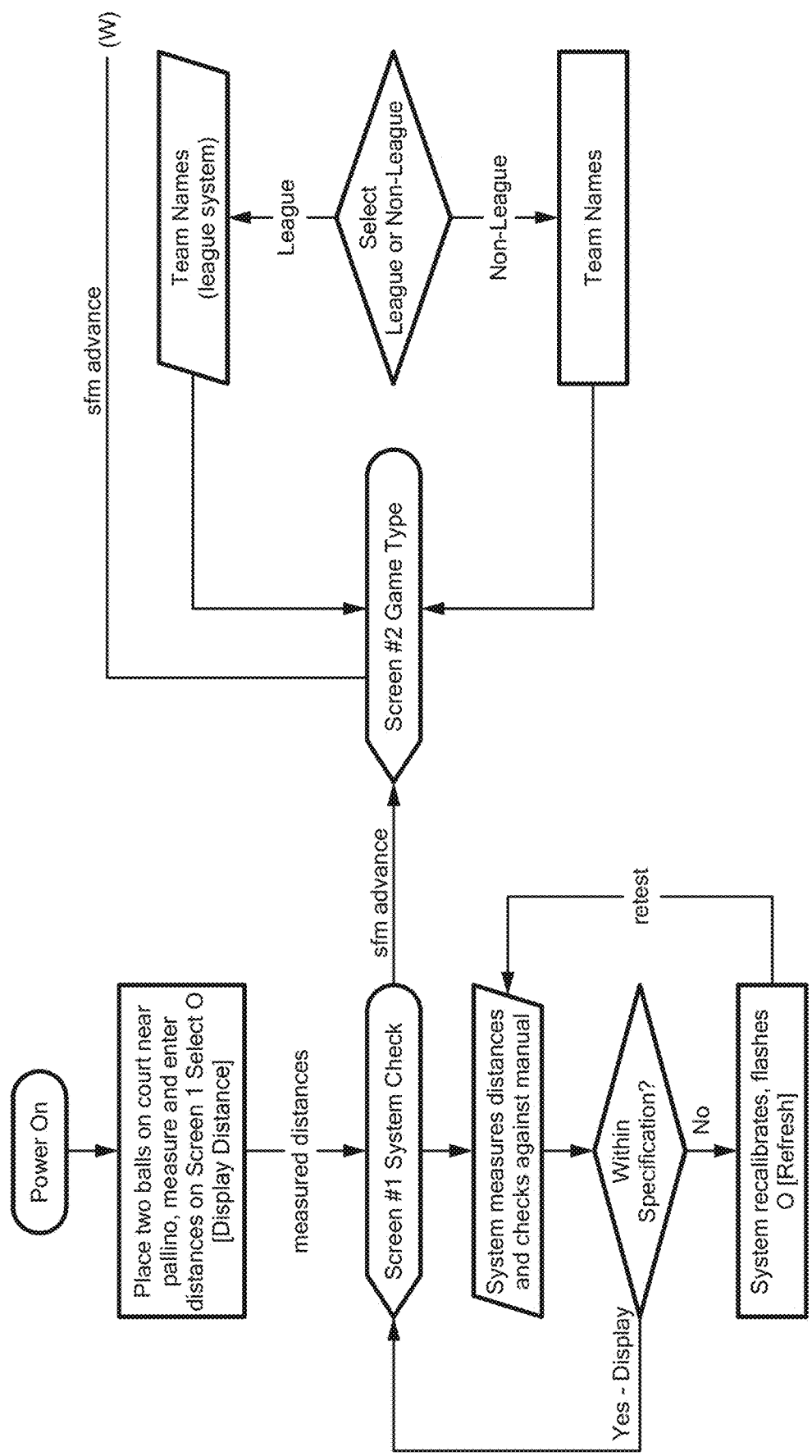
FIGS. 6A-C are flow charts that describe and illustrate several embodiments of the inventive concepts herein.
Figure 6B:
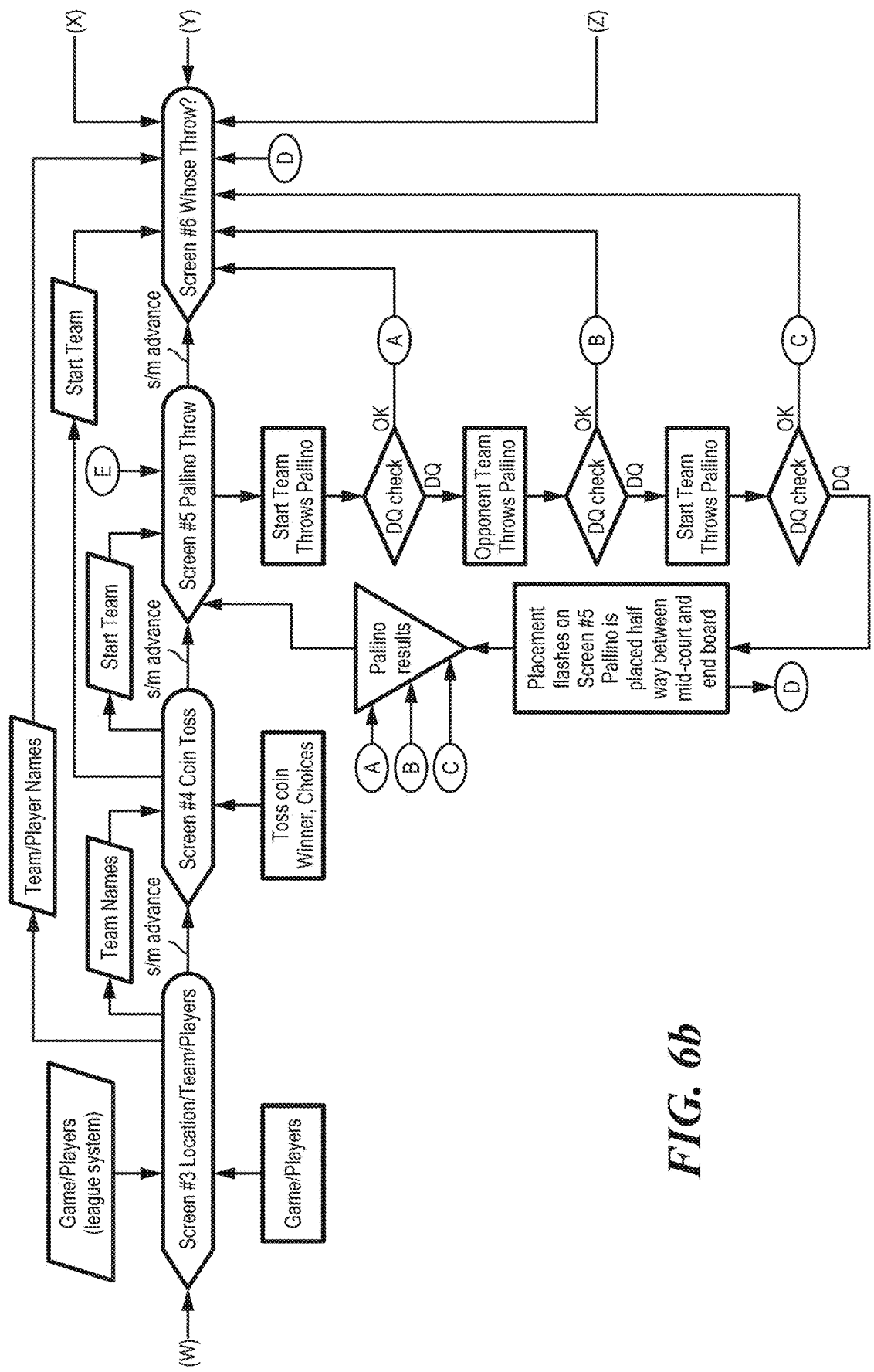
Figure 6C:
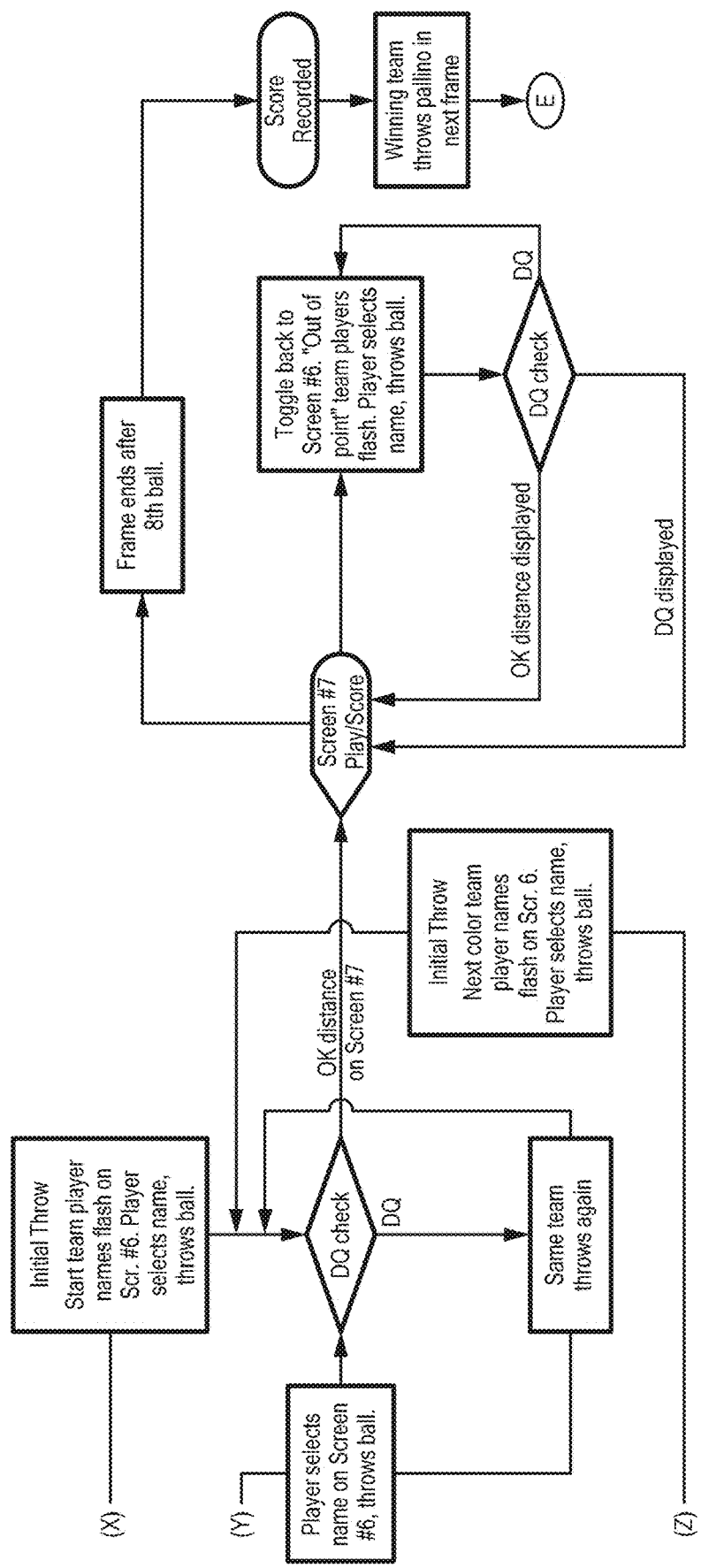

FIGS. 6A-C are flow charts that describe and illustrate several embodiments of the inventive concepts herein.

FIGS. 5A-G show typical screen displays which exhibit inputs and results related to the execution of the activities depicted in the system flow chart (FIGS. 6A-C).

The game begins after system power is turned on. Two balls are placed on the court near the pallino and their respective distances from the pallino are measured manually and entered on Screen #1 System Check. "O"Display Distance is selected and the system measures distances and compares against manual distances. If system measurements are within specification, the system advances to Screen #2 Game Type. If system measurements are not within specification, the system recalibrates, flashes "O"Refresh, and performs retest. This cycle continues until system measurements are within specification.

On Screen #2 Game Type, League or Non-League is selected and Team/Player names entered. On Screen #3 Location/Team/Player, player names and other related data are entered.

Screen #4 Coin Toss records outcome of coin toss and selections as to start or color choice. The "turn arrow" for the starting team lights up on Scoreboard Display 209 The starting team tosses the pallino and the result is displayed on Screen #5 Pallino Throw. If a successful pallino toss is made, the system advances to Screen #6—Whose Throw?, where the coin toss—winning players names flash. If the toss is disqualified, as described earlier, subsequent tosses are made until successful, or a pallino placement is made.

Screen #6 Whose Throw? displays respective team names and colors and lists team players. First player from the team that won the coin toss selects their name and throws ball. If the throw does not strike the end board, distance result is shown on Screen #7 Play/Score, as well as 1-color ("num—color") in the "Balls in Point" space. The Scoreboard Display 209 lights up the second team "turn arrow". The system then toggles back to Screen #6—Whose Throw, where the "Out of point" team players flash, and that team's player selects name and throws their first ball. (If, however, the first team's ball hits the end board without first striking the pallino, DQ is shown on Screen #7 Play/Score and that team throws again until a successful throw is made.) If the second team's first ball hits the end board without first striking the pallino, or another ball, DQ is shown on Screen #7 Play/Score, and that team plays another ball. This cycle continues until the second team makes a valid throw, at which point the distance will be displayed on Screen #7 Play/Score. If that ball comes to rest closer to the pallino than the first team's initial throw, Screen #7 Play/Score now shows 1-color ("num—color") in the "Balls in Point" space for the second team and play reverts to the first team. Scoreboard Display 209 lights up first team "turn arrow". Play continues in this fashion, with the team which does not have any "Balls in Point" throwing until it achieves the closest distance to the pallino, or runs out of balls. When one team has thrown all of its balls, the other team may throw its remaining balls. "Point Score" is then updated on Scoreboard Display 209, and the winning team starts the next frame from the opposite end. The "game score" on Scoreboard Display 209 will be updated when one team reaches the agreed winning game score.

Figure 7:
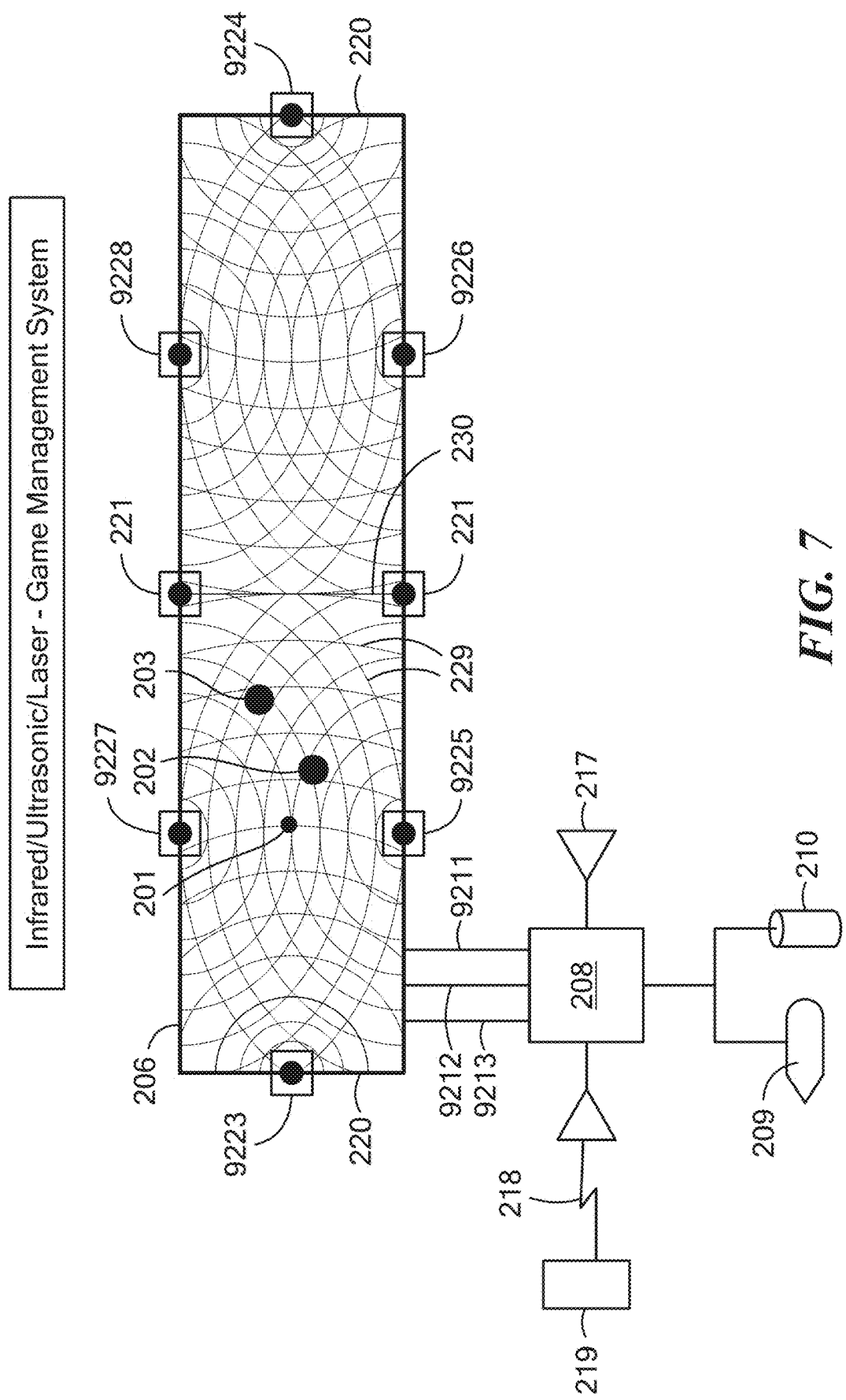
FIG. 7 illustrates another preferred embodiment of the inventions herein utilizing sensors and emitters that may be ultrasonic, infrared or lasers that are installed along the end, centerline and sides of a court and connected to a wireless game management system.

FIG. 7 is a schematic diagram illustrating use of transmitters and sensors that can transmit and detect infrared, ultrasonic or laser signals in order to determine distances between objects of play on a court or field and also their relative position on the court or field, in accordance with one exemplary embodiment.

Shown is pallino 201, Bocce "red" 202, Bocce "green" 203, bocce court 206, Game management processor 208, display 209, data storage 210, end board communication link 9211, side board communication link 9212, center court communication link 9213. Also shown are side board sensor/emitter units 9225 and 9226, 9227 and 9228; end board sensor/emitter units 9223 and 9224; court end board detector units 220; centerline sensor/emitter units 221; wireless device 219; wireless link 218; antenna 217 for wireless transmission to and from bluetooth or wireless emitters such as described in FIGS. 2 and 3 optionally contained in pallino 201 and bocce 202 and 203 in order to transmit object specific information back to processor 208 such as bocce or pallino, red or green bocce, bocce number and or associated team or player as determined in conjunction with positional location of the played objects as discussed in this application; and wireless signals 229 and 230 that are emitted from end board and sideboard sensor/emitters and are controlled by and utilized within processor 208 to determine distance between objects at play and the location on the court 206.

The sequence of operation generally is as follows. The pallino 201 is tossed by a player onto the court 206 from one end toward the other. Processor then interrogates the end board detector 220, or waits for the pallino to collide with the end board detector 220. Processor 208 may initiate side board and end board sensors to generate a signal as shown in 229 to sweep the playing surface in order to determine the starting position of pallino 201. This position may be displayed on display 219 and 209, and stored in memory 210. If the position of pallino 201 is not past the centerline, or if the pallino hits the court end board detector 220, the processor then receives a signal from the unit 220 and then signals that the throw was not a valid throw, and alerts players via display 219 or 209 that the pallino must be thrown again by the opposing team until a successful throw is determined by the system or the pallino is placed at a default position.

If no end board detector event occurs or is received by processor 208, processor then determines that Team red may throw the first red ball and alerts players, officials and spectators by annunciation and/or display that a valid throw has occurred, prompts the player to prepare to throw the bocce 202, and then the system prepares for the first red bocce to be thrown. The system then is readied to begin play. It is also at this time that processor 208 may initiate side board and end board sensors to generate a signal as shown in 229 to sweep the playing surface in order to determine the starting position of pallino 201. This position may be displayed on display 219 and 209, and stored in memory 210.

Upon play of the first bocce 202, and upon the bocce being determined to be at a state of rest on the court 206, the system initiates end of court and sideboard sensor/emitter units 9223-9228 and generates infrared, ultrasonic or laser signals as shown by signals 229 to sweep the playing surface as shown. Upon interruption of the signals transmitted with any objects, in this case pallino 201 and bocce "red" 202, reflected signals are detected and received by sensors in the end of court and sideboard units and communicated back to processor 208 via comm links 9211-9212.

Processor is programmed in advance with the position of the sensor/emitter units relative to the court 206 and the exact dimensions of the court surface, and then uses data received from the sensors to calculate the relative size of the objects (in order to discern the smaller pallino from the bocce). This may be determined by ascertaining at the processor 208 the distance from the side sensors 9225-9228, calculating the outer margin of the object being measured according to the start and end point of when the signal was broken and the relative distance from the side and end board sensor/emitter units. Data received from the sensors is also then used to calculate the position of the bocce "red" 202 relative to pallino 201 and a measurement between the two objects and also relative court position is determined. At this point, the measurement information and graphical depiction of the objects on the court, or associated real-time display via camera input into processor 208 as previously incorporated by reference may be displayed to players, spectators and game officials via displays 209 and 219. Any related statistical information related to player statistics, odds as calculated against a particular opponent team etc may be calculated by processor 208 or retrieved from memory 210 and displayed or annunciated.

At this point, processor may then prompt via display or annunciation for Team Green and/or a particular player registered in advance to play the first Bocce "green" 203 as shown. Similarly, upon detection that all the objects at play are in a resting position, such as by motion detectors or the like, the system may repeat the same procedure to initiate the end of court and sideboard sensor/emitter units 9223-9228 and generates signals as shown by signals 229 to sweep the playing surface as described before. Upon interruption of the signal transmitted with the objects, in this case now pallino 201, bocce "red" 202 and bocce "green" 203, reflected signals are detected and received by sensor in the end of court and sideboard units and communicated back to processor 208 via communication links 9211-9212. This process may continue until all plays have been executed in order to have processor log the historical data related to play position, in order to calculate points and analysis and documentation. This system can help to speed up the rate of play, more accurately determine measurements, provide a more dynamic and exciting environment for spectators, facilitate betting online and log statistical play information for season averages, training purposes and competitive analysis such as is used in other sports such as football.

If the pallino hits the court end board detector 220, processor then receives a signal from the unit 220 and then signals that the throw was not a valid throw, and alerts players via display 219 or 209 that the pallino must be thrown again by the opposing team until a successful throw is determined by the system or the pallino is placed at a default position.

Figure 8:
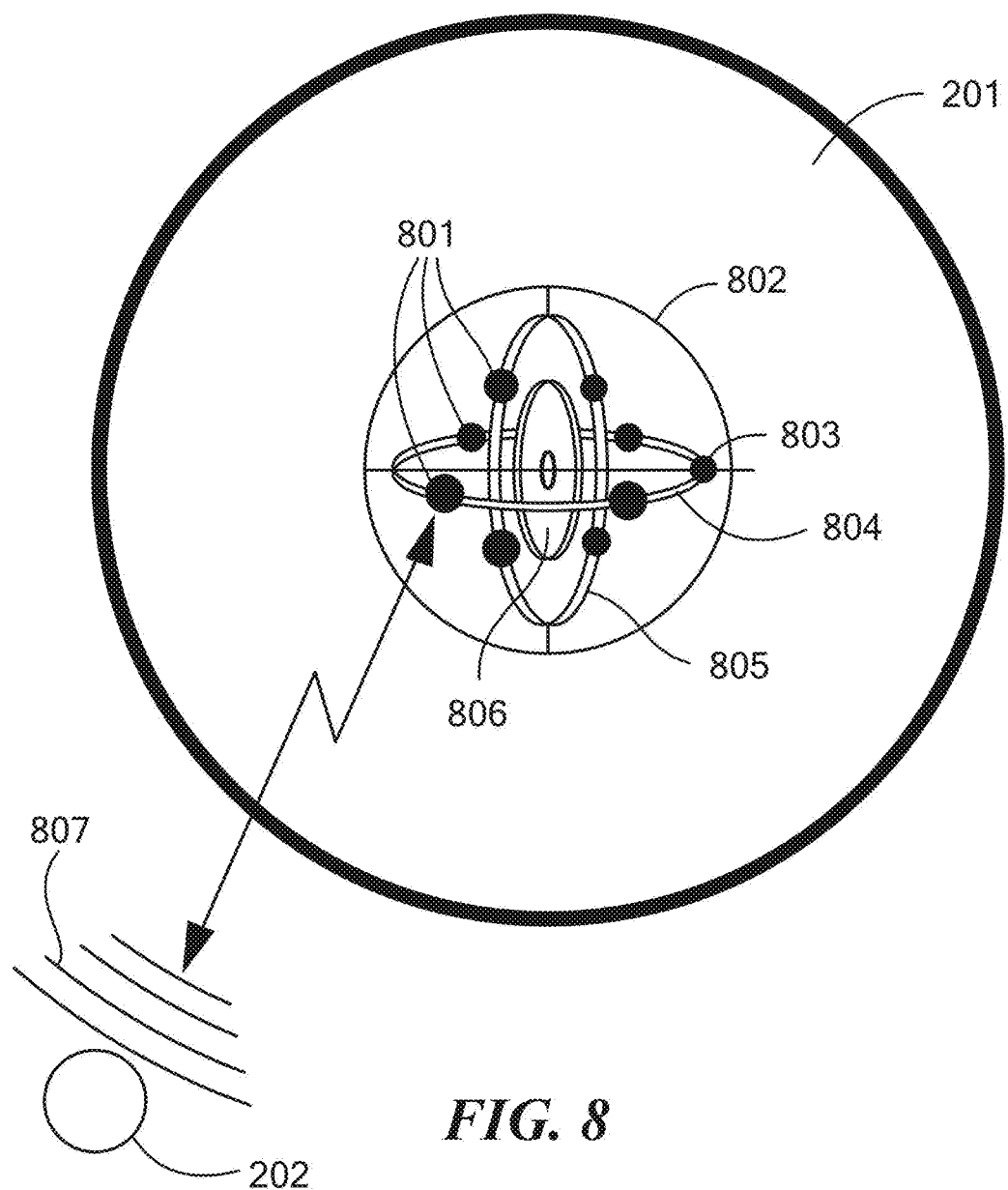
FIG. 8 illustrates another embodiment of the inventions herein that employs signal sensors and emitters that may be ultrasonic, infrared or laser that are installed within one or more objects such as a pallino used in play in the game of bocce along with an optional gyroscope.

FIG. 8 is a schematic diagram showing a pallino 201 that includes a gyroscopic insert along with other various electronics such as shown in FIGS. 10 and 3, in accordance with one exemplary embodiment. It should be noted that the gyroscope need not be a spinning gyroscope as illustrated but instead may any of a variety of other types of gyroscopes, e.g., MEMS resonating or tuning-fork gyroscopes. Alternatively, the gyroscope may be omitted from the embodiment, however in one embodiment it will ensure that emitter/detector units 801 will transmit or receive ultrasonic, infrared or laser signals on a level playing surface in a more consistent manner when measure distance to other played objects to communicate with other emitter/detectors in the system. The emitter/detector units may also be in communication with wireless module as discussed in detail in FIG. 10 and also shown in FIG. 3.

By way of example, upon successful play of the pallino on court 206 in FIG. 2 or FIG. 7, a signal 807 can be generated after motion has ceased, as determined by a motion sensor 306 discussed in FIG. 3 or some other means such as a motion detector on the court surface. Processor 304 can initiate a signal generation from emitter/detector 801 and that signal can be transmitted from the pallino 201, which may preferably be a clear or translucent material or a material suitable to transmit ultrasonic signals out to be reflected off bocce "red" 202. Detector in 801 then receives the reflected signals and a distance may be calculated by processor 304 in FIG. 3 or by processor 402 shown in FIG. 4 or by a system as shown with processor 208 in FIG. 2 or other systems discussed. A good overview of one embodiment of the laser measurement technology may be found at www.lgstatic.transcat.com, incorporated by reference.

Additionally, bocce-specific identifying information such as ball color, team or player information that was entered in the processor and wireless game management system before game play such as described earlier. This information may be stored in the game processor memory and associated with a particular unique identifier associated with the particular ball played, or other information and could be transmitted or received at antenna 217 in FIGS. 2, 4, 7 or other systems discussed herein to a wireless receiver unit similar to that shown in FIG. 4, for association with the measurement information determined by the IR/ultrasonic or laser emitter/detector 801 such as shown in FIG. 8. Wireless game processor 208, 402 or other processors, could then make available for display, annunciation and storage the various information related to a particular play, including court position, ball identity, location and distance measurements relative to other players and/or the pallino and the like.

It is anticipated that wireless antenna 217 shown could be more than one antenna connected to the system, and could allow for triangulation or closer proximity to the played objects by being positioned in the corners for example, depending upon system design.

Figure 9:
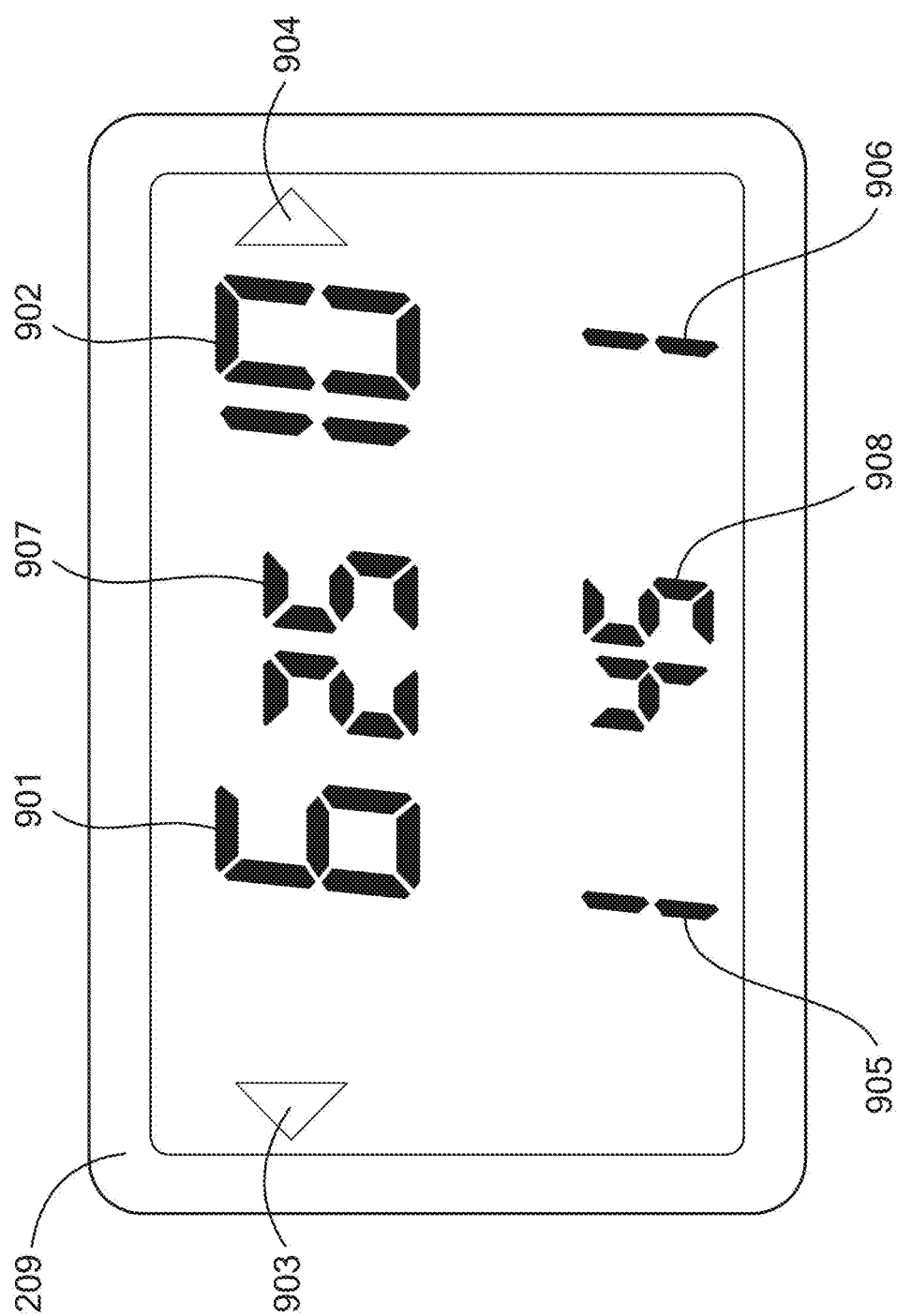
FIG. 9 shows a scoreboard display and user interface that can be used for real time or historical game related data display in communication with the wireless game management processor shown in FIG. 4.

FIG. 9 is a schematic diagram showing one exemplary embodiment of the Scoreboard Display 209 attached to the Wireless Game Management System described herein. It is configured in the preferred embodiment for the game of Bocce, however other adaptations for different games could be used without departing from the inventive concepts shown herein.

Display 209 includes a number of elements, including Pointscore 901 for bocce team red and Pointscore 902 for bocce team green. Each period of play allows all of the red and green bocce balls (202 and 203 not shown) to be recalculated with regard to distance from the Pallino (201 not shown) as discussed earlier and each of the bocce balls has a unique identifier to differentiate every ball and each position measured against the Pallino 201 during successive periods of play. For example, if Team Green displaces team Red's bocce ball in a successive period of play and the green Bocce ball comes to rest at a closer proximity to the Pallino, then the score can be recalculated. Alternatively, upon play of the Bocce balls 201 and 202, the Pallino 203 may be hit during play and the resultant move may cause a change of Bocce ball positions relative to the Pallino, thereby requiring recalibration as discussed earlier. Shot clock 907 provides that upon the elapse of a period of time, in this case 30 seconds, a shot must occur within that time frame and then a loud announcement or sound or display may indicate that it is the other teams turn to play. Penalties or a default of that turn of play may be assessed against players that delay the game beyond the time allocated by the shot clock 907.

Gameclock 908 displays the elapsed minutes in the particular game and may automatically pause game time during measurement by the Wireless Game Management System or some other event determined by the particular ruleset of the game being managed. Upon expiration of the elapsed period of time allocated for the game, an announcement or alarm may be heard or displayed along with the results of the winner of that match, as indicated by Gamescore 905 and 906, and by some other audible or visual means. Turn arrows 903 and 904 are interesting in that they are illuminated in the color of the team currently up to play, whilst the opposing teams turn arrow is not illuminated until it is their turn. This game display can be located at opposing ends of the bocce court and allows for more easy viewing by spectators or visually challenged players and can also incorporate other unique features discussed in this application.

In an alternative embodiment, an improvement is proposed in the inventive systems described above to deal with the occurrence of two or more game objects that are closer than the accuracy threshold of the particular measurement technique employed in the wireless game management system. Ideally, the measurement technique will be of sufficient accuracy for all occurrences. However, there may be cost trade-offs, environmental limitations, system failures, or technology issues that prevent measurement 100% of the time. However, the overall system design may still provide sufficient performance to yield the benefits of improved game speed and accurate data measurement for most of the game turns played.

For example, an ultra wide band object location system such as commercially available by "Bespoon" has a reported accuracy that is within a few centimeters. In the game of Bocce, or other games, such accuracy may be sufficient for automatic detection and measurement determinations in the wireless game management system taught herein in a high percentage of game plays. However, in a less common occurrence, both object balls, such as Bocce red and Bocce green, may be initially determined to be closer than the maximum accuracy threshold of the particular location detection system employed (e.g., in the case of such ultra wide band object location, both objects may be determined to be within a few centimeters). In this case, the system may acquire the location data associated with each Bocce object in relation to the target pallino, determine that each target is within a difference that is not detectable by the regular location detection system, and, under direction of the wireless game management system, generate an alert signal that triggers an auxiliary measurement routine to determine the Bocce object nearest the pallino target. Such an auxiliary measurement routine could be manually performed by a laser measurement device or a tape measure used in response to a humanly discernible measurement fault signal generated by the system. Alternatively, the auxiliary measurement routine could be initiated by a measurement fault signal that is generated by the wireless game management system in response to detection of two object game pieces (such as bocce red and bocce green) that are both closer than a few centimeters of the target object (pallino). This measurement fault signal could be electronic in nature and used by the wireless game management system to trigger an additional automatic auxiliary measurement system to determine a more precise measurement for determination of the object closest to the target. Such an auxiliary measurement routine and system could include an overhead camera system that can provide images of object and target locations, for transmission to the wireless game management system for computation to determine the nearest object such as is known in the art by companies such as "Hawkeye" (https://www.hawkeyeinnovations.com/sports/snooker) and other camera based measurement systems incorporated herein by reference. Other auxiliary systems may comprise laser, infrared, ultrasound, or other signals and triangulation techniques, Hall sensors, or other methods discussed herein. Additionally, a human-discernible signal can be generated by the wireless game management system in conjunction with an electronic measurement fault signal to alert players and officials to suspend game play until a final distance determination is performed.

An auxiliary alert and measurement module and routine can be triggered by the wireless game management system automatically or in response to a manual initiation by persons officiating over the game. The auxiliary location measurement event and resulting measurement data can be recorded in the game history storage at the wireless game management system for later statistical analysis, auditing and historical archiving of gameplay as well as display at integral displays or connected wireless devices as discussed herein.

Embodiments of the present invention also include various types of graphical user interfaces for managing games or tournaments of bocce or other games. FIGS. 5A-G described above show a user interface and screen displays that could be utilized for data input, system initiation and management, calibration, and statistical analysis and player or game related data display, in accordance with one exemplary embodiment. Purely for the sake of example, the following is a description of an alternative exemplary user interface and screen displays. This exemplary embodiment comprises the following ten screens that can be accessed from a main or menu screen:

1. Access Screen—select current match.
2. Match Setup Screen—Records and displays game/match parameters, and coin toss/lag outcomes.
3. Team Roster/Playing Order Screen—Displays Team Names, Colors,
Players/Substitutes, Player Numbers, playing order, and Shooting End. Receives Shots taken/Points made and Bay's taken/made (match and cumulative) from screen 5 (Playing Status Screen).
4. Play Input Screen—Records play results which are displayed on screen 5 (Playing Status Screen), screen 6 (Frame Point Tracker Screen), and screen 3 (Team Roster/Playing Order Screen).
5. Playing Status Screen—Displays game/match information from screen 4 (Play Input Screen) and background information from other screens. This screen serves as the primary community display.
6. Frame Point Tracker Screen—Receives information from screen 1 (Access Screen), screen 2 (Match Setup Screen), and screen 5 (Playing Status Screen). Displays frame and game outcomes.
7. Summary Outcome Screen—Displays Game and Match outcomes.
8. Team Schedule Screen—Displays Team schedule and performance.
9. League Schedule Screen—Displays League schedule and performance.
10. League Standing Screen—Displays Team ranking using information from screen 7 (Summary Outcome Screen).

Screen 1 (Access Screen) includes the following types of information:

| | |
|---|---|
| Access Code | [0163] |
| Location | [BABC] |
| League | [Fall 2019] |
| Date | [Oct. 13, 2019] |
| Time | [6:15 P] |
| Court # | [2] |
| Team Name | [LBV] |
| Team Name | [CASA] |

Here, team names are provided from screen 9 (League Schedule Screen).

Screen 2 (Match Setup Screen) includes the following types of information:

| | | |
|---|---|---|
| Start Time | [6:15 p] | (from 1. Access Screen) |
| Number of Games | [X] | (default value 3) |
| Match Duration | [MM] | (default value 60) |
| Number of Balls | [X] | (default value 8) |
| Game Length: Game # | | Points |
| 1 | | [6] (default values shown) |
| 2 | | [6] |
| 3 | | [5] |
| Coin Toss/Ball Lag | | Color | Start |
| Winner [Team 1 Name] [Team 2 Name] | [0 0] | [Y/N] |
| Loser [Team 2 Name] [Team 2 Name] | [0 0] | [Y] |

Here, team names supplied from screen 1 (Access Screen).

Screen 3 (Team Roster/Playing Order Screen) includes the following types of information for each team, e.g., displayed side-by-side on the screen:

| Team Name [ ] | (Starting Team from screen 2 Match Setup Screen) | | | |
|---|---|---|---|---|
| Color [ ] | (Color Choice Team from screen 2 Match Setup Screen) | | | |
| Roster: | Match | Cum | Match | Cum |
| 1 [Name] [Number] | [Shots][% Pts] | [Shots][% Pts] | [Bays][% W] | [Bays][% W] |
| 2 [Name] [Number] | [Shots][% Pts] | [Shots][% Pts] | [Bays][% W] | [Bays][% W] |
| 3 [Name] [Number] | [Shots][% Pts] | [Shots][% Pts] | [Bays][% W] | [Bays][% W] |
| 4 [Name] [Number] | [Shots][% Pts] | [Shots][% Pts] | [Bays][% W] | [Bays][% W] |
| 5 [Name] [Number] | [Shots][% Pts] | [Shots][% Pts] | [Bays][% W] | [Bays][% W] |
| 6 [Name] [Number] | [Shots][% Pts] | [Shots][% Pts] | [Bays][% W] | [Bays][% W] |
| 7 [Name] [Number] | [Shots][% Pts] | [Shots][% Pts] | [Bays][% W] | [Bays][% W] |
| 8 [Name] [Number] | [Shots][% Pts] | [Shots][% Pts] | [Bays][% W] | [Bays][% W] |
| Substitute Players | | | | |
| 9 [Name] [Number] | [Shots][% Pts] | [Shots][% Pts] | [Bays][% W] | [Bays][% W] |
| 10 [Name] [Number] | [Shots][% Pts] | [Shots][% Pts] | [Bays][% W] | [Bays][% W] |
| 11 [Name] [Number] | [Shots][% Pts] | [Shots][% Pts] | [Bays][% W] | [Bays][% W] |
| 11 [Name] [Number] | [Shots][% Pts] | [Shots][% Pts] | [Bays][% W] | [Bays][% W] |
| Playing Order | | | | |
| Player | | | | |
| End Ball# | Name | Number | | |

```
S       1
        2
        3
        4
N       5
        6
        7
        8
```

Screen 6 (Frame Point Tracker Screen) includes the following types of information:

```
Location *_____        League*_____
Date *_____            Time*_____    CT.# *_____
                (* from screen 1 Access Screen)
GAME#           (from screen 5 Playing Status Screen)
COLOR       TEAM        COLOR           TEAM
                (from screen 2 Match Setup Screen)
                (from screen 5 Playing Status Screen)
FRM         PTS     CUM     FRM     PTS     CUM
1                           1
2                           2
3                           2
4                           4
5                           5
6                           6
7                           7
8                           8
9                           9
10                          10
[NO LIMIT ON NUMBER OF FRAMES]
TEAM                        POINTS
                (from screen 5 Playing Status Screen)
GAME WINNER
GAME LOSER
```

Screen 7 (Summary Outcome Screen) includes the following types of information:

```
Location *_____        League*_____
Date *_____            Time*_____    CT.# *_____
                (* from screen 1 Access Screen)
GAME #      Winner      Pts     Loser       Pts
1
2
3
4
MATCH
        Winner      Games Total     Loser       Games Total
                    Won Pts.                    Won Pts.
```

Without limitation, the following is an overview of system operation with reference to this exemplary user interface and screen displays, in accordance with one exemplary embodiment:

1. Official opens [Bocce Score]. Select 1. Access Screen. Enter [Access Code], [Location], [League Name], [Date], [Time], [Court #]. Team Names will be displayed from 9. League Schedule Screen.

2. Return to Menu. Select 2. Match Setup Screen. Start Time is displayed from 1. Access Screen. Default values are displayed for [Number of Games], [Match Duration], [Number of Balls], [Game Length]. Perform Coin Toss/Lag. Select Starting Team and Team colors. Starting Team color flashes on 5. Playing Status Screen, along with starting [Player Name] and [Playing End]. Note: at BABC matches always starts at South End.

3. Return to Menu. Select 3. Team Roster/Playing Order Screen. Captain selects Players/Subs, and sets playing order.

(For example, if Red has 3 players at one end and 2 players at the other end, shooting order might be entered as follows: [Jones], [Smith], [Brown], [Jones] at one end, and [Taylor], [Taylor], [Fordyce], [Fordyce] at the other end.

4. Play commences—Outcome entered on 4. Play Input Screen, according to the following algorithm:

(A) If first player makes a potential point, push POINT button and then ENTER button. Potential Team point is incremented in [FRAME SCORE] on 5. Playing Status Screen, and first player credited with shot and potential point on 3. Team Roster Screen/Playing Order Screen. Balls remaining are decremented on 5. Playing Status Screen. First player [Player Name] of opposite team flashes on 5. Playing Status Screen. After that player rolls, outcome entered on 4. Play Input Screen. Play continues until point is established or shooting team has no balls remaining.

(B) If first player does not make a potential point (which would be the case if that ball struck the end board, without having first struck the pallino), push NO POINT button on the 4. Play Input Screen. Shot attempt recorded on 3. Team Roster/Playing Order Screen. Balls remaining are decremented and next player name flashes on 5. Playing Status Screen. After that player rolls, Outcome entered on 4. Play Input Screen. Play continues until point is established or shooting team has no balls remaining.

(C) Point for the first rolled ball is flagged, awaiting outcome of opposing team first ball. If opposing team first ball scores a point, the original first ball point is reversed in 3. Team Roster/Playing Order Screen.

(D) When Game Length score is obtained, all lights flash, and match score is incremented on 5. Playing Status Screen. Game results reflected on 6. Frame Point Tracker Screen and 7. Summary Outcome Screen. [Player], [Frame Score], [Playing End], [Balls Remaining], and [Game Score] all adjusted for start of next game. Next game started on 6. Frame Point Tracker Screen.

5. POINT CHANGE: If the pointing team has balls remaining, when the other team has none, pointing team color and next [Player Name] flashes on 5. Playing Status Screen. After that player rolls, the scoring algorithm is employed, with two exceptions:

(A) If the playing team decreases the number of its scoring balls, the [Point Change]"−" button on 4. Play Input Screen is pushed (as many times as the number of points decreased). This decrements [FRAME SCORE] on 5. Playing Status Screen and decredits player's potential points on 3. Team Roster/Playing Order Screen. Play continues until there are no balls remaining.

(B) If playing team promotes the opposite Team's ball(s) into scoring position, the [Point Change] "−" button on 4. Play Input Screen is pushed as many times as necessary to zero out playing team points and increment the opposite team's points. Play continues until shooting team has no balls remaining.

6. BAY: The "BAY" is a BABC option which may be invoked prior to the final shot of a team which already has potential scoring points. BAY button is pushed on 4. Play Input Screen. All lights flash on 5. Playing Status Screen, and audio announces "Bay Alert!". "BAY" means that the shooting team is betting that their last shot will make a scoring point. If it does, Point Change (+) button on 4. Play Input Screen is pushed twice to credit shooting team for that point and for an additional bonus point. "Bay" attempt and both points are credited to the shooter on 3. Team Roster/Playing Order Screen. If "BAY" shot fails to score, or moves the other team's balls into scoring position, the Point Change "−" button on 4. Play Input Screen is used to decrement the shooting team [FRAME SCORE] on 5. Playing Status Screen. The shooter is credited with "Bay" attempt on 3. Team Roster Screen/Playing Order Screen. Audio announces "Bay Choke!. If BAY shot advances opposite Team's ball(s), go to 5(B).

7. ENTER: [ENTER] button closes frame, and increments [GAME SCORE] on 5. Playing Status Screen and 6. Frame Point Tracker Screen.

8. Ties: When a ball has been declared tied with the opponents' previously scored ball, the tying ball is awarded POINT on 4. Play Input Screen. Then Point Change (−) button is pushed to zero out FRAME SCORE.

Purely for the sake of example, the following is a description of yet another alternative exemplary user interface and screen displays. This exemplary embodiment comprises the following ten screens that can be accessed from a main or menu screen:

A Menu Screen provides for hierarchical role-based system access including access to the other screens.

Figure 12:
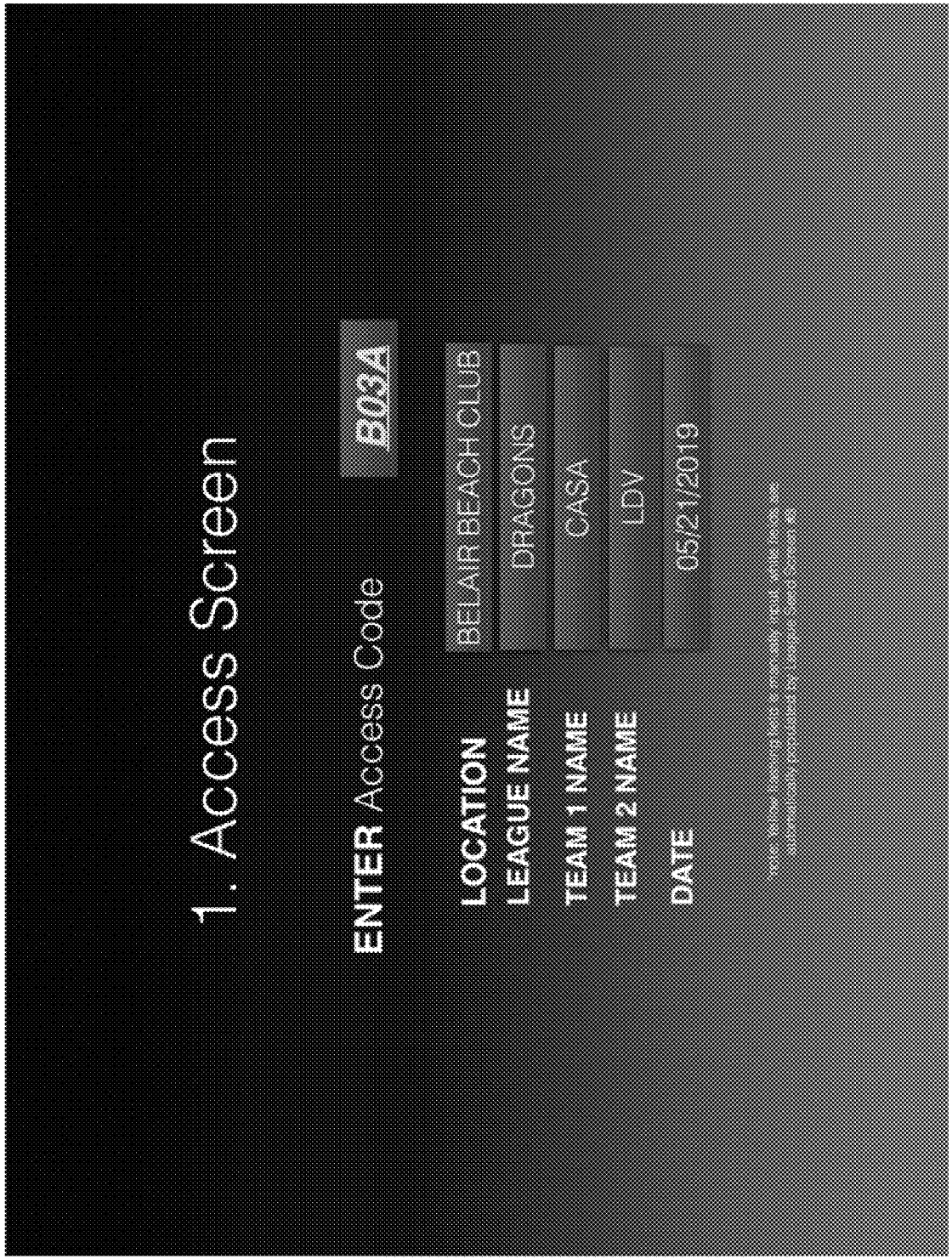
FIG. 12 shows a sample Access Screen in accordance with one exemplary embodiment.

An Access Screen (FIG. 12) allows selection of a specific match.

Figure 14:
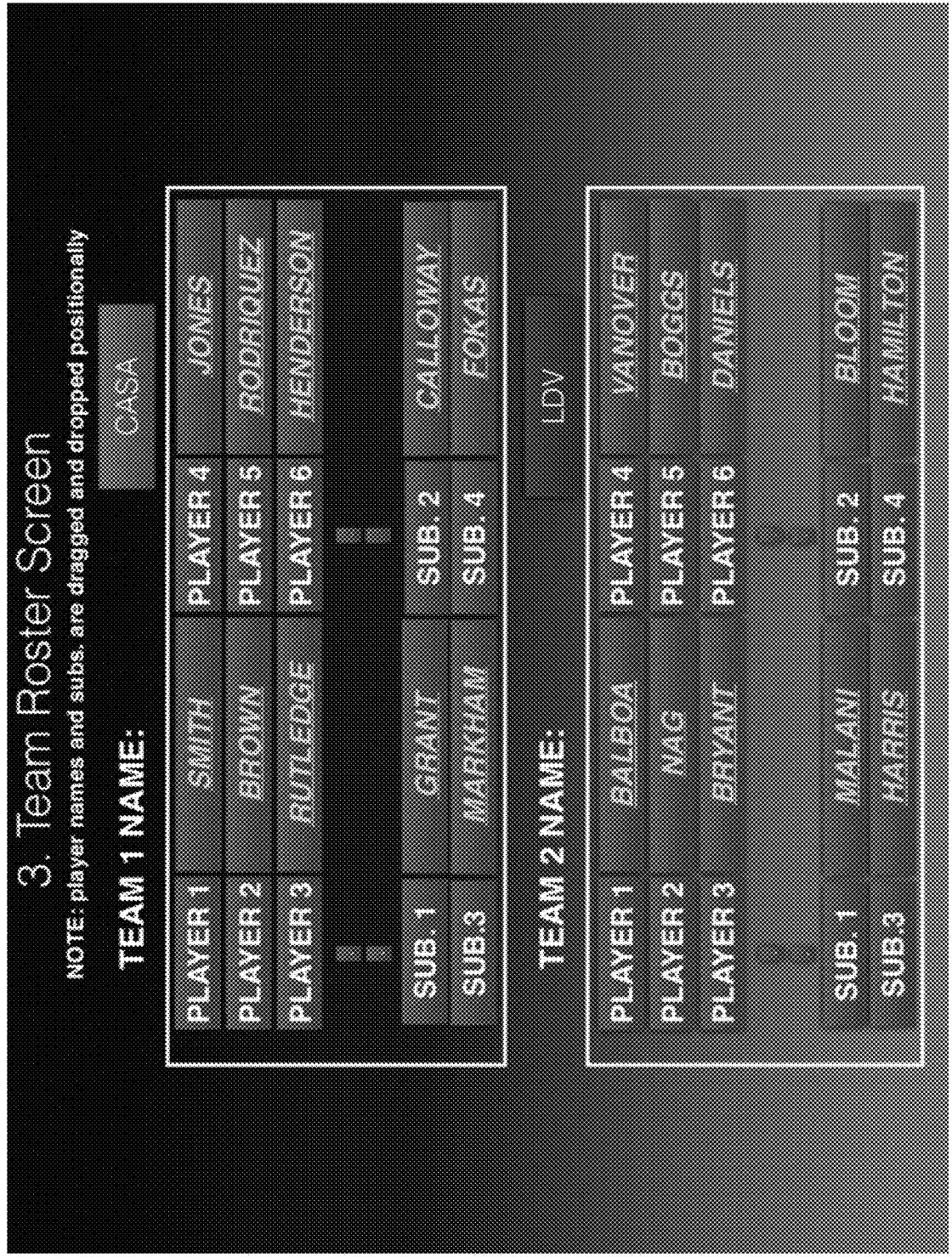
FIG. 14 shows a sample Team Roster Screen in accordance with one exemplary embodiment.

A Team Roster Screen (FIG. 14)—Based on specific match selected, displays Team names, players/substitutes and Captain, assigned shooting order, and shooting end based on a specific selected match, and also receives player shots taken and points made from the Playing Status Screen.

Figure 13:
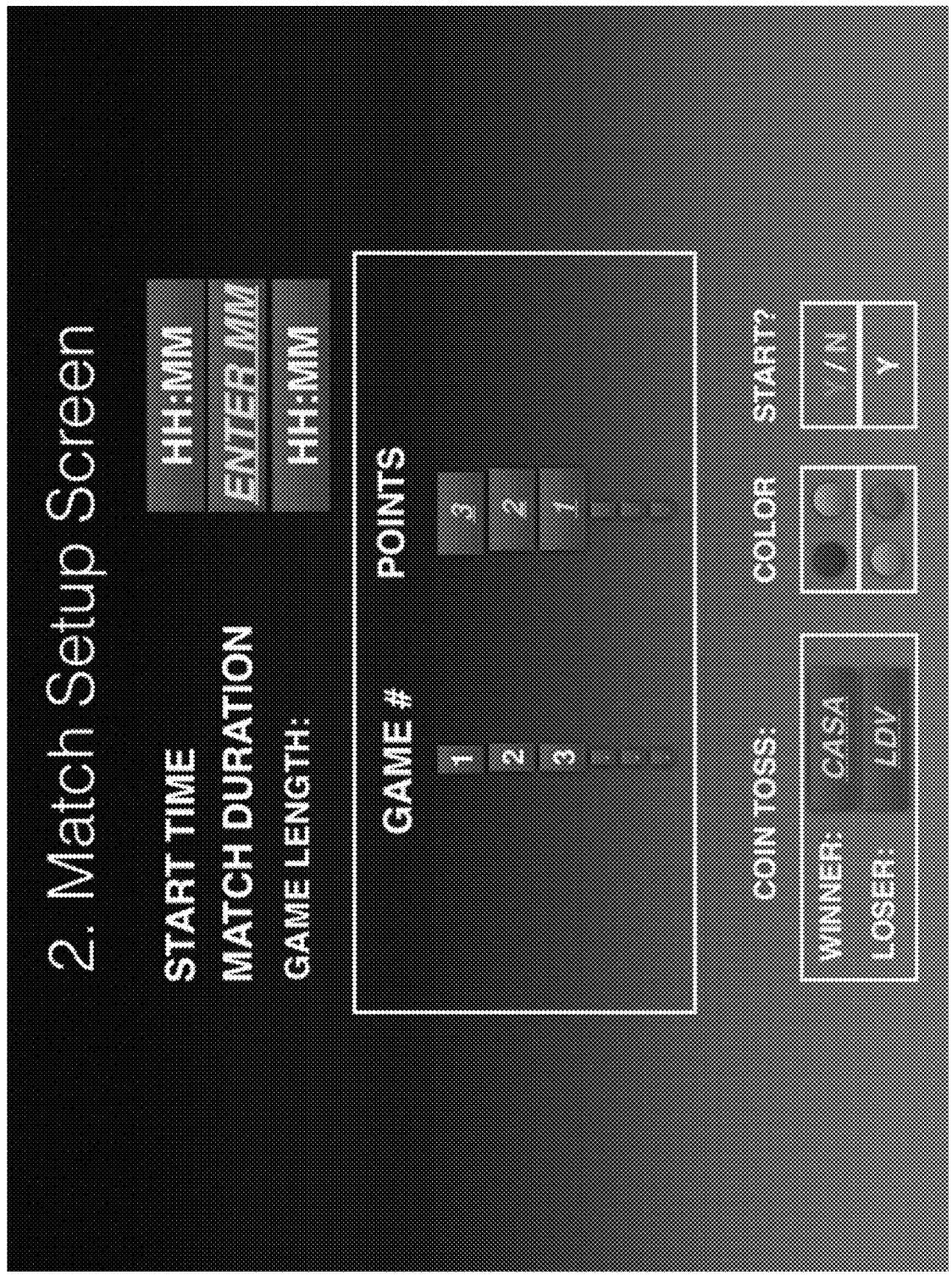
FIG. 13 shows a sample Match Setup Screen in accordance with one exemplary embodiment.

A Match Setup Screen (FIG. 13) records and displays game/match parameters, as well as coin toss/lag outcomes.

Figure 16:
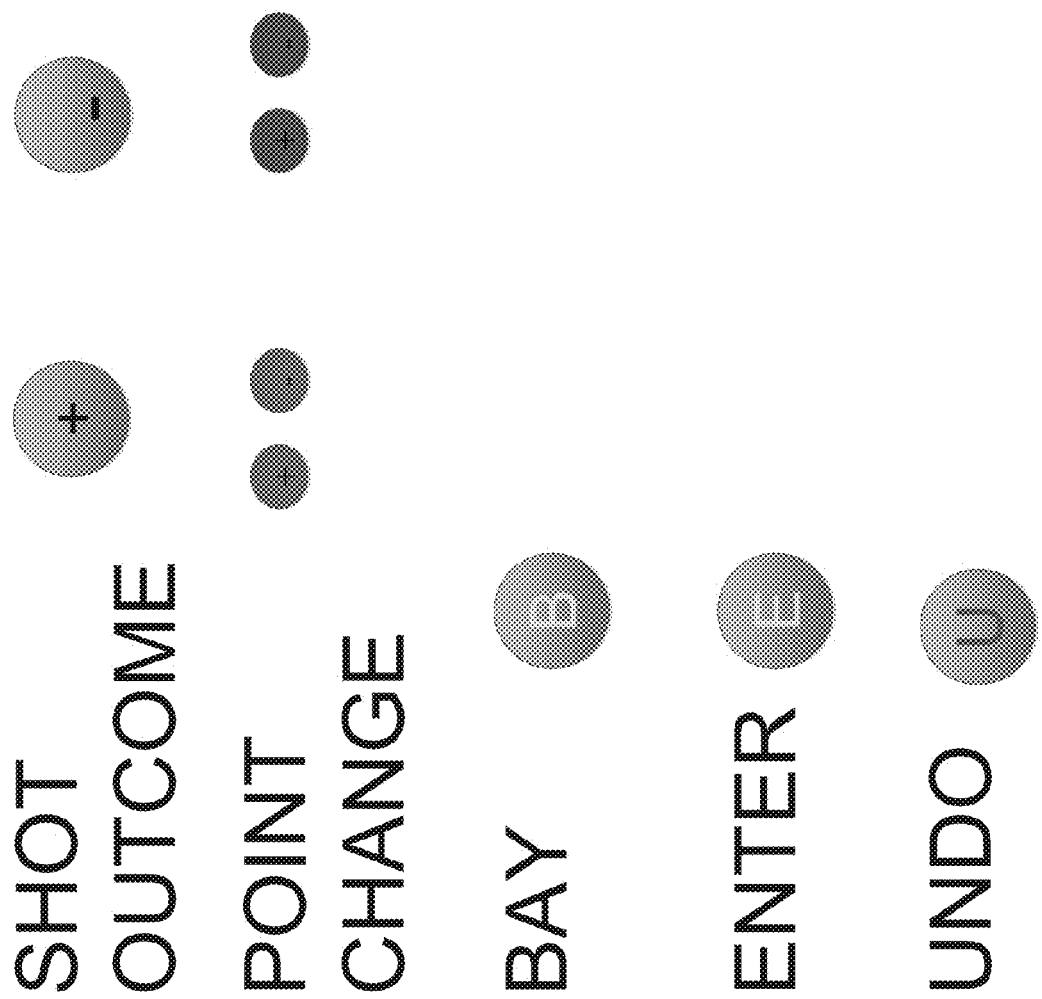
FIG. 16 shows a sample Play Mode Screen in accordance with one exemplary embodiment.

A Play Mode Screen (FIG. 16) records real-time game information, which is displayed on the Playing Status Screen and Summary Outcome Screen.

Figure 15:
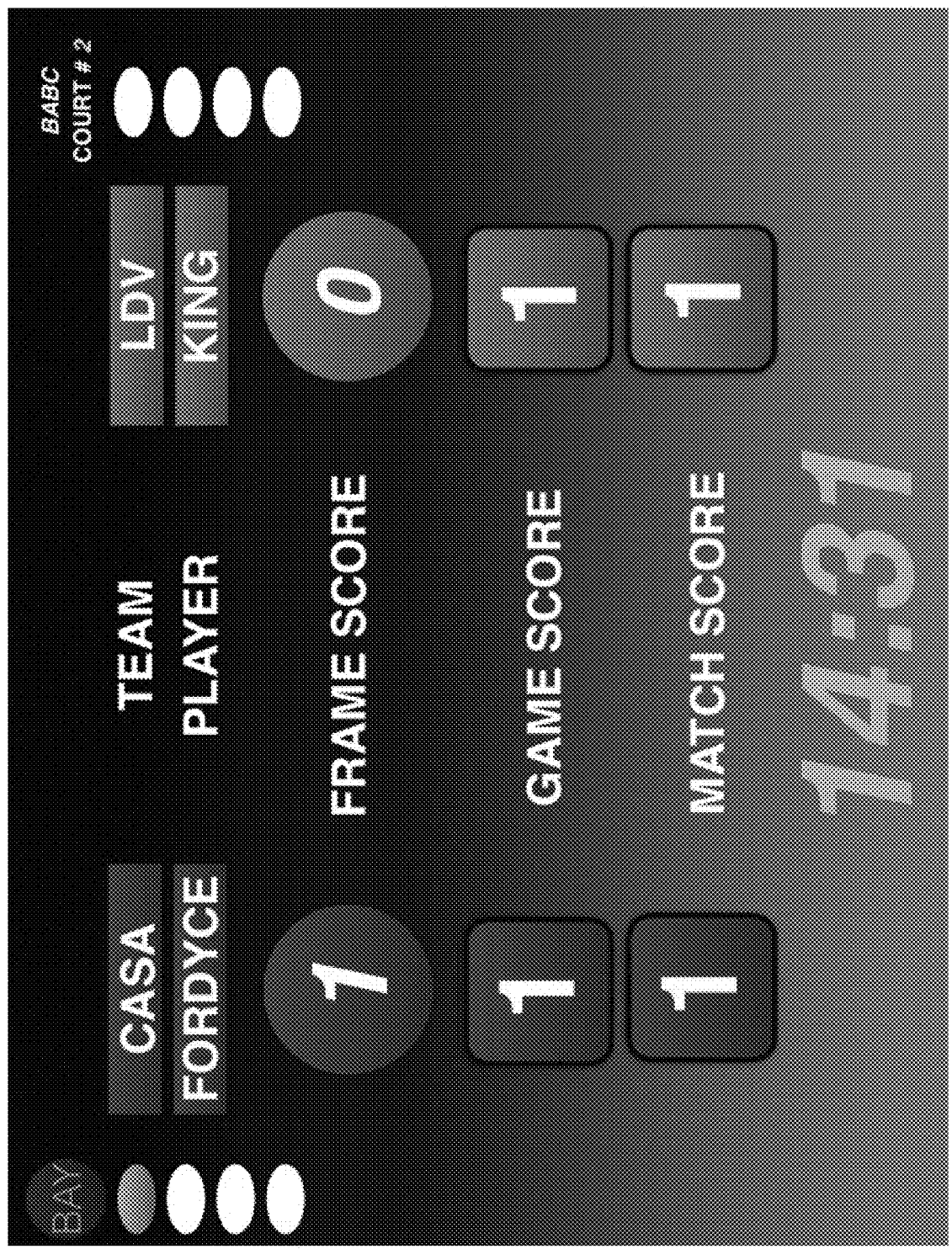
FIG. 15 shows a sample Playing Status Screen in accordance with one exemplary embodiment.

A Playing Status Screen (FIG. 15) displays real-time game/match information from the Play Mode Screen and background information from other screens.

Figure 17:
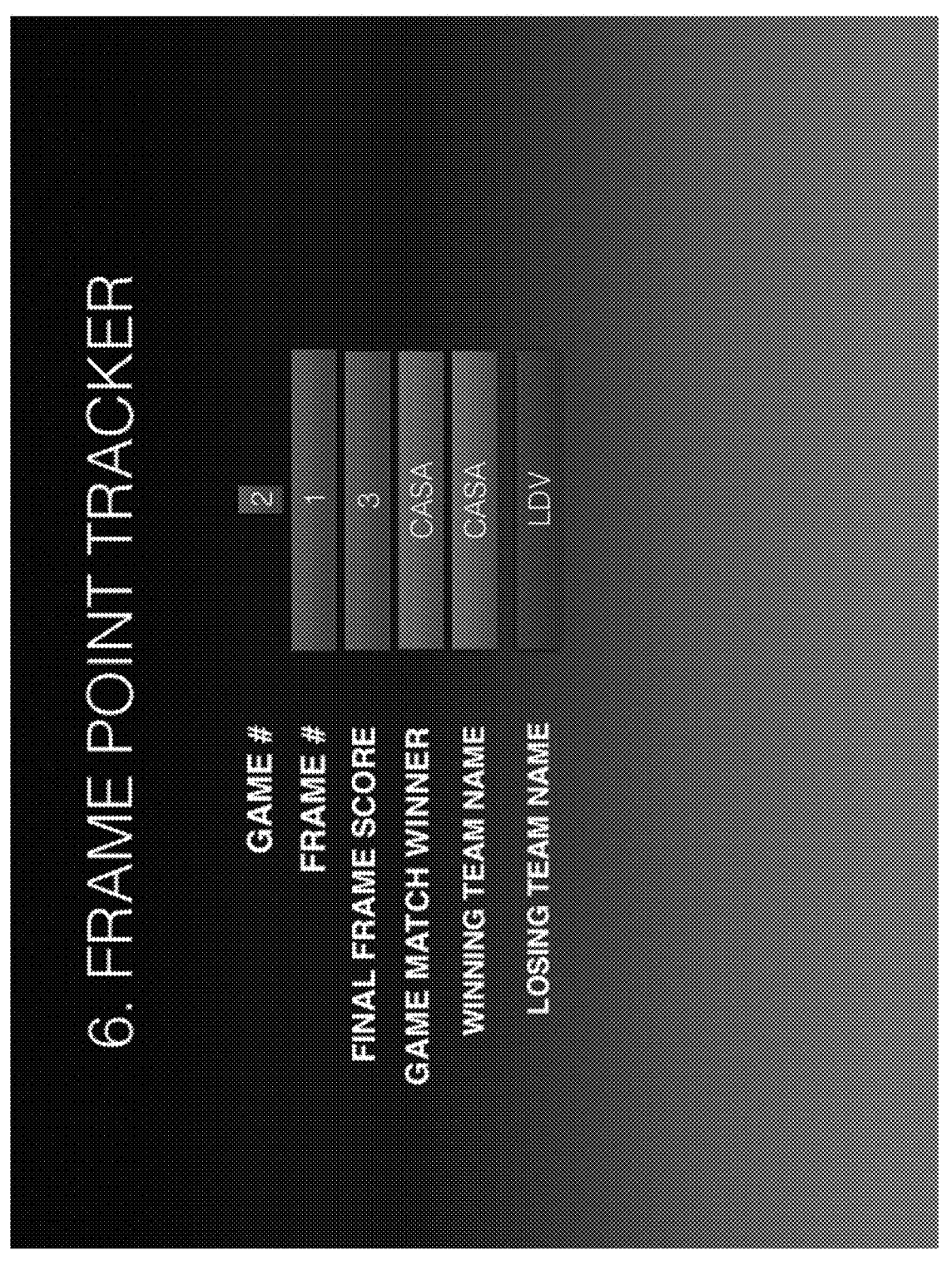

A Summary Outcome or Frame Point Tracker Screen (FIG. 17) receives and accumulates information.

Figure 19:
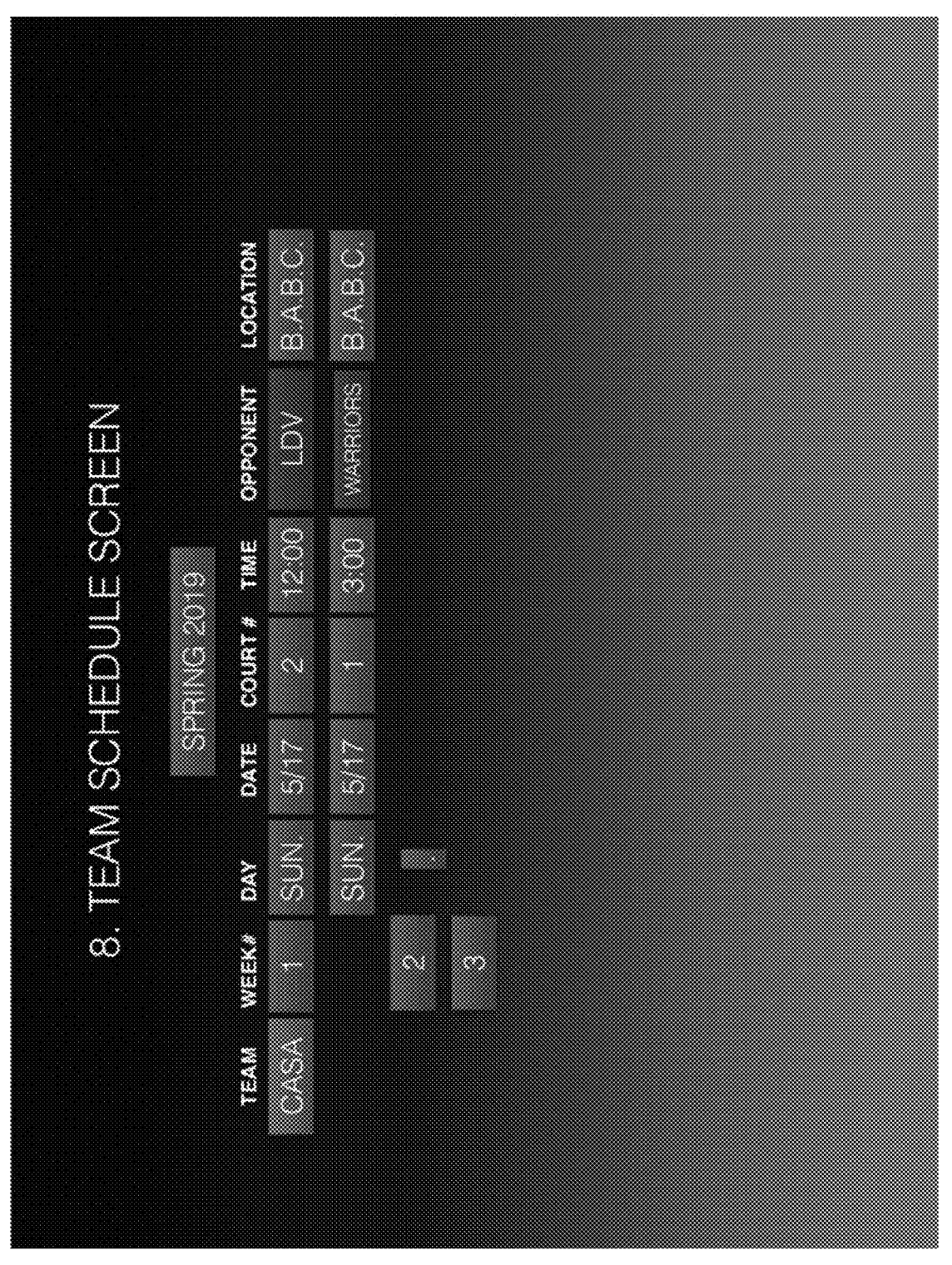

A Team Schedule Screen (FIG. 19) displays Team schedule and performance to date.

A League Schedule Screen (FIG. 18) displays league schedule and performance information.

A League Standing Screen (FIG. 20) displays Team ranking using information from the Summary Outcome Screen.

Without limitation, the following is an overview of system operation with reference to this exemplary user interface and screen displays, in accordance with one exemplary embodiment:

1. Official opens [Bocce Score]. Select MenuScreen. Select AccessScreen. Enter [Access Code] then [Location], [League Name], [Date], [Time], [Court #].

2. Return to MenuScreen. Select TeamRosterScreen. Based on Team Captain input, select Players, enter Subs, and set shooting order. (For example, if Red has 3 players at one end and 2 players at the other end, shooting order might be entered as follows: [Jones], [Smith], [Brown], [Jones] at one end, and [Taylor], [Taylor], [Fordyce], [Fordyce] at the other end.

3. Return to MenuScreen. Select MatchSetupScreen. Enter [# of Balls], [Match Duration], [Game Length] (number of games and game point length). Perform Coin Toss/Lag. Assign starting Team and Team colors. Starting Team color flashes on PlayingStatusScreen, along with starting [PlayerName] and [shooting end].

4. Play commences—first player shoots. Outcome entered on PlayModeScreen according to the following algorithm:

(A) If first player makes a potential point, push ShotOutcome "+". Potential Team point is incremented in [FRAME SCORE] on PlayingStatusScreen, and first player credited with shot attempt and potential point on TeamRosterScreen. Shooting team "Balls Remaining" is decremented on PlayingStatus Screen. First [PlayerName] of other team flashes on PlayingStatusScreen. That player shoots. Outcome entered on PlayModeScreen. Play continues until point is established or shooting team has no balls remaining.

(B) If first player does not make a potential point (which would be the case should that player hit the end board without having struck the pallino), push ShotOutcome "−" button on the PlayModeScreen. Player shot attempt recorded on TeamRosterScreen. Shooting team [Balls Remaining] is decremented and next player name of the same team flashes on PlayingStatusScreen. That player shoots. Outcome recorded on PlayModeScreen. Play continues until point is established or shooting team has no balls remaining.

(C) Special treatment of first scored point—credit for the first scored point is reversed if opposing team throws their first ball closer. This means that the initial throw is validated as a potential point only if the opposing team does not throw a better ball.

(D) When GameLength score is reached, all lights flash, and match score is incremented on PlayingStatusScreen and SummaryOutcomeScreen. [Played], [FrameScore], [Frame#], [ShootingEnd], [BallsRemaining], and [GameScore] all adjusted for start of next game.

5. ADDITIONAL POINTS: If the pointing team has balls remaining, when the other team has none, pointing team color and next [Player Name] flashes on PlayingStatusScreen. That player shoots. The scoring algorithm is employed, with two exceptions:

(A) If the shooting team decreases the number of its scoring balls, the [PointChange] "−" button on the PlayModeScreen is pushed (as many times as the number of points decreased). This decrements [FRAME SCORE] on PlayingStatusScreen and decredits the player's potential points on TeamRosterScreen. Play continues until shooting team has no balls remaining.

(B) If shooting team promotes the other Team's ball(s) into scoring position, the [PointChange] "−" button on the PlayModeScreen is pushed as many times as necessary, and [PointChange] (+) button for other Team's ball(s) which have been advanced into scoring position. Play continues until shooting team has no balls remaining.

6. BAY: The "BAY" is a Bel-Air Bay Club (BABC) option, which may be invoked prior to the final shot of a team which already has potential scoring points. BAY button is pushed on PlayModeScreen. All lights flash on the PlayingStatus Screen and audio announces "Bay Alert!". "BAY" means that the shooting team is betting that their last shot will make a scoring point. If it does, PointChange (+)

button on PlayModeScreen is pushed twice to credit shooting team for that point and for an additional bonus point. "Bay" attempt and both points are credited to the shooter on TeamRosterScreen. If the "BAY" shot fails to score, or moves the other team's balls into scoring position, the PointChange "−" button on PlayModeScreen is used to decrement the shooting team [FRAME SCORE] on the PlayingStatusScreen. The shooter is credited with "Bay" attempt and "Bay" choke on the TeamRosterScreen. Audio announces "Bay Choke!". If the BAY shot advances the other Team's ball(s), go to 5(B).

7. ENTER: The [ENTER] button closes the frame, and increments [GAME SCORE] on the PlayModeScreen and the SummaryOutcomeScreen. If GameLength has been reached, [MatchScore] is incremented on PlayingStatusScreen.

8. UNDO: The [UNDO] button clears most recent entries made on the PlayModeScreen and all related locations.

It should be noted that different games will have different rules and different types of game status that needs to be determined based on the absolute or relative positions of one or more game pieces. Some examples are provided above, for example, determining whether the pallino has passed a center line, determining that a ball has hit an end board or another ball, determining that a ball has been thrown or rolled, determining the ball that is closest to the pallino, etc. Other types of events might include, for example, determining which game piece traveled the furthest (e.g., for a "longest ball" competition in golf or for a homerun hitting contest in baseball), determining whether a game piece landed in-bounds or out-of-bounds relative to a field of play, or monitoring motion of a game piece such as the speed, direction, distance, path, or other characteristic, to name but a few. Thus, in some cases, embodiments can be used to monitor activities and provide feedback to the user, such as, for example, for practicing an activity by the user or for providing therapy to a user (e.g., having the user perform a particular activity and monitoring progress).

The following provide some examples of other game systems, which can be modified to include and utilize one or more of the inventive concepts described herein.

U.S. Pat. No. 5,125,669, is incorporated by reference. This patent shows manual measurement of distances between objects and illustrates another depiction of a traditional Bocce court. Other approaches utilize specialized laser devices that fit onto one ball and can measure distance to an adjacent ball, but in all of these examples, it requires manual intervention and can be subject to disputes for accuracy, often times slowing down the speed of play and frustrating spectators. Such approaches would benefit from the inventive concepts herein.

US 20060267286 (Hickey) entitled GAME SET INCLUDING PROJECTILES WITH INTERNAL DISTANCE MEASURING MEANS discusses the use of wireless signals to measure the positions of projectiles relative to a target object in games, such as bocce and petanque, that involve rolling, throwing, tossing, or otherwise moving a projectile toward the target object.

US 20150146003 discusses a method for measuring distances between a pallino and one or more bocce balls on a bocce court in which one or more cameras are mounted above the bocce court which detect the position of the bocce balls and the pallino and use one or more algorithms to make a distance measurement from each bocce ball to the pallino. These distances can then be sorted from closest to furthest such that scoring results can instantly be shown on a monitor mounted in or near the bocce court. This system can obstruct the view for spectators that can be seated above and looking down on the court and has limitations due to shadowing from light sources, etc. Such a system could be augmented with the inventive concepts herein to overcome its inherent limitations, and is incorporated by reference.

US 20130075972 A1 entitled Bocce modifying game is another example of games that could benefit from the inventive concepts herein, and is incorporated by reference.

US 20070262518 A1 entitled Golf bocce game is another example of a game that could benefit from the invention and is incorporated by reference.

In U.S. Pat. No. 6,998,965 assigned to Edge Technology is shown a system for golf utilizing RFID tags contained in golf balls. This patent is incorporated by reference to be adapted to the inventive concepts herein.

U.S. Pat. No. 9,646,199 (Bose) entitled MULTI-SENSOR EVENT ANALYSIS AND TAGGING SYSTEM describes a system that analyzes data from multiple sensors, potentially of different types, that track motions of players, equipment, and projectiles such as balls.

US 20150088464 (Yuen) entitled METHODS AND SYSTEMS FOR CLASSIFICATION OF GEOGRAPHIC LOCATIONS FOR TRACKED ACTIVITY describes a method of assigning an identifier to an event based on activity data and geo-location data associated with a monitoring device worn by a user.

Embodiments of the present invention can be used to determine a game piece position relative to any of a variety of game playing boundaries such as, for example, a football line of scrimmage, a football first down line (e.g., to determine if there was a first down), a hockey red or blue line (e.g., to determine if there was an offsides or icing), a goal line (e.g., football, hockey, soccer, etc.), an out-of-bounds line (e.g., a baseball first or third base line, a baseball foul pole, a soccer field boundary, etc.), etc. In this regard, wireless modules can be placed in various types of game pieces (e.g., footballs, baseballs, soccer balls, hockey pucks, etc.) as well as in any of various places within the field of play and/or in various measurement devices (e.g., along boundary lines, in baseball foul poles, in football field goal crossbar and uprights, in football first down "chains" to detect whether the football has reached or passed the first down mark, etc.). Such embodiments may improve the speed and accuracy of game play, e.g., reducing or eliminating the need for manual first down measurements during football games or reducing or eliminating the need for replay reviews for hockey goals. This could be especially advantageous because the position of a game piece such as a football or hockey puck often can be hidden or obscured from visual inspection such as under a pile of fallen bodies. The ability to determine the game piece position as described herein could provide competitive advantages and increase spectator interest such as in new sports leagues that compete with traditional sports leagues by using advanced technologies.

It should be noted that the wireless module devices and the game management processor device may include a wireless interface for wireless communication and a processor (e.g., a microprocessor with memory and other peripherals and/or application-specific hardware) configured accordingly to perform device functions. Wireless communication may employ communication technologies including, but in no way limited to, analog technologies, digital technologies, optical technologies, wireless technologies (e.g., Bluetooth), networking technologies, and internetworking technologies (e.g., TCP/IP-based protocols).

It will be appreciated that bocce and other types of games utilizing wireless modules of the types described herein may be played on an "open" court, e.g., on a beach, lawn, patio, or parking lot with no physical boundaries such as end and side boards. Thus, certain embodiments may include a plurality of game pieces including wireless modules and a wireless game management processor. Other embodiments may include one or more boundary elements (e.g., side boards, end boards, etc.) that can be physical boundaries (e.g., boards the prevent the game pieces from passing) or "soft" boundaries that can sense the location of game pieces. Such boundary elements may be provided with or separate from the game pieces and wireless game management processor. Similarly, other embodiments may include a playing surface such as a mat or rug, which may include various sensors as discussed herein. Such a playing surface may be provided with or separate from the game pieces and wireless game management processor.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the wireless module processors and game management processor described herein) are necessarily non-conventional because, absent special programming or configuration, the conventional components do not inherently perform the described non-conventional methods.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A wireless game management system comprising:
   a plurality of game balls for a bowling game comprising at least one reference ball and a plurality of play balls, each game ball including a magnet substantially at the center of the game ball that provides magnetic signals;
   a game court for the bowling game having a game surface configured for the plurality of game balls to be rolled thereon during play of the bowling game;
   an army of sensors in or under the game surface, each sensor providing an output signal based on the magnetic signals; and
   a wireless game management processor coupled to the sensor, and configured to:
      determine absolute positions of at least two game balls of the plurality of game balls based on the sensor output signals,
      determine a game status based on the determined absolute positions of the at least two game balls, and
      convey game status information based on the determined game status through a graphical user interface associated with the wireless game management processor, wherein the game status information includes at least a score of the bowling game.

2. The system of claim 1, wherein the sensors are hall effect sensors.

3. The system of claim 1, where the magnets are fixed magnets.

4. The system of claim 1, wherein the magnets are electromagnets.

5. The system of claim 1, wherein different types of game balls are configured to produce different types of magnetic fields, and wherein the wireless game management processor is configured to distinguish between different types of game balls based on the different types of magnetic fields.

6. The system of claim 5, wherein the different types of magnetic fields include at least one of magnetic fields having different strengths or magnetic fields having different magnetic patterns.

7. The system of claim 1, wherein the game surface is placed over the array of sensors.

8. The system of claim 1, wherein the sensors are embedded in the game surface.

9. The system of claim 1, wherein the array of sensors comprises at least one roll or sheet containing sensors.

10. The system of claim 9, wherein the at least one roll or sheet is used as the game surface.

11. The system of claim 1, wherein the bowling game is lawn bowling.

12. The system of claim 1, wherein the bowling game is petanque.

13. The system of claim 1, wherein the plurality of game balls are bocce game balls including a pallino ball as the reference ball and at least two sets of bocce balls as the plurality of play balls.

14. A wireless game management system comprising:
   a plurality of game balls for a bowling game comprising at least one reference ball and a plurality of play balls, each game ball including a magnet substantially at the center of the game ball that provides magnetic signals;
   a game court for the bowling game having a game surface configured for the plurality of game balls to be rolled thereon during play of the bowling game;
   an array of sensors in or under the game surface, each sensor providing an output signal based on the magnetic signals; and
   a wireless game management processor coupled to the sensors and configured to:
      determine relative positions of at least two game balls of the plurality of game balls based on the sensor output signals,
      determine a game status based on the determined relative positions of the at least two game balls, and
      convey game status information based on the determined game status through a graphical user interface associated with the wireless game management processor, wherein the game status information includes at least a score of the bowling game.

15. The system of claim 14, wherein the sensors are hall effect sensors.

16. The system of claim 14, where the magnets are fixed magnets.

17. The system of claim 14, wherein the magnets are electromagnets.

18. The system of claim 14, wherein different types of game balls are configured to produce different types of magnetic fields, and wherein the wireless game management processor is configured to distinguish between different types of game balls based on the different types of magnetic fields.

19. The system of claim 18, wherein the different types of magnetic fields include at least one of magnetic fields having different strengths or magnetic fields having different magnetic patterns.

20. The system of claim 14, wherein the game surface is placed over the array of sensors.

21. The system of claim 14, wherein the sensors are embedded in the game surface.

22. The system of claim 14, wherein the array of sensors comprises at least one roll or sheet containing sensors.

23. The system of claim 22, wherein the at least one roll or sheet is used as the game surface.

24. The system of claim 14, wherein the bowling game is lawn bowling.

25. The system of claim 14, wherein the bowling game is petanque.

26. The system of claim 14, wherein the game balls are bocce game balls including a pallino ball as the reference ball and at least two sets of bocce balls as the plurality of play balls.

\* \* \* \* \*

UNITED STATES PATENT AND TRADEMARK OFFICE
CERTIFICATE OF CORRECTION

| | | |
|---|---|---|
| PATENT NO. | : 11,517,802 B1 | Page 1 of 1 |
| APPLICATION NO. | : 17/195030 | |
| DATED | : December 6, 2022 | |
| INVENTOR(S) | : Daniel A. Henderson et al. | |

It is certified that error appears in the above-identified patent and that said Letters Patent is hereby corrected as shown below:

In the Claims

In Column 31, Line 36, change:
"army" to --array--

Signed and Sealed this
Fourteenth Day of February, 2023

*Katherine Kelly Vidal*

Katherine Kelly Vidal
*Director of the United States Patent and Trademark Office*